United States Patent
Kakishima et al.

(10) Patent No.: US 8,873,666 B2
(45) Date of Patent: Oct. 28, 2014

(54) COMMUNICATION CONTROL METHOD, BASE STATION APPARATUS AND MOBILE STATION APPARATUS

(75) Inventors: Yuichi Kakishima, Tokyo (JP); Katsutoshi Kusume, Tokyo (JP); Hidekazu Taoka, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/816,509

(22) PCT Filed: Aug. 12, 2011

(86) PCT No.: PCT/JP2011/068458
§ 371 (c)(1),
(2), (4) Date: Mar. 19, 2013

(87) PCT Pub. No.: WO2012/023516
PCT Pub. Date: Feb. 23, 2012

(65) Prior Publication Data
US 2013/0182787 A1 Jul. 18, 2013

(30) Foreign Application Priority Data
Aug. 16, 2010 (JP) .................................. 2010-181788

(51) Int. Cl.
*H04B 7/02* (2006.01)
*H04L 1/02* (2006.01)
*H04B 7/06* (2006.01)

(52) U.S. Cl.
CPC .............. *H01B 7/0478* (2013.01); *H04B 7/063* (2013.01); *H04B 7/0652* (2013.01); *H04B 7/0639* (2013.01)
USPC ........................... 375/267; 375/259; 375/260

(58) Field of Classification Search
CPC ... H04B 7/0639; H04B 7/0652; H04B 7/0478
See application file for complete search history.

(56) References Cited

U.S. PATENT DOCUMENTS

| | | | |
|---|---|---|---|
| 2010/0309998 A1* | 12/2010 | Jung et al. ................... | 375/260 |
| 2011/0200081 A1* | 8/2011 | Guo et al. .................... | 375/224 |
| 2011/0261713 A1* | 10/2011 | Kishiyama et al. .......... | 370/252 |
| 2012/0045018 A1* | 2/2012 | Zhou et al. ................... | 375/296 |

(Continued)

FOREIGN PATENT DOCUMENTS

JP 2009089188 A 4/2009

OTHER PUBLICATIONS

Office Action for Japanese Patent Application No. 2010-181788, issued Aug. 6, 2013, with English translation thereof (4 pages.).

(Continued)

*Primary Examiner* — Erin File
(74) *Attorney, Agent, or Firm* — Osha Liang LLP

(57) ABSTRACT

In order to suppress deterioration of the throughput performance of the whole system in the MIMO system performing MIMO transmission, the present invention is characterized in that in a codebook in which there are defined a plurality of precoding weights and a plurality of PMIs (Precoding Matrix Indicators) assigned to the precoding weights, bit information of the PMIs assigned to the precoding weights is adjusted in such a manner as to suppress an effect of feedback error from a mobile station apparatus. The bit information of the PMIs assigned to the precoding weights is adjusted in such a manner as to suppress an effect of a transmission beam formed with a PMI in which feedback error is detected.

12 Claims, 14 Drawing Sheets

(56) References Cited

U.S. PATENT DOCUMENTS

2012/0140694 A1* 6/2012 Sun et al. ............... 370/312
2012/0329502 A1* 12/2012 Frederiksen et al. ...... 455/509
2013/0142271 A1* 6/2013 Nilsson et al. ........... 375/267
2013/0163545 A1* 6/2013 Taoka et al. .............. 370/329

OTHER PUBLICATIONS

Notification of Reasons for Rejection in corresponding Japanese application No. 2010-181788 dated May 21, 2013 (4 pages).
Espacenet Abstract, Publication No. JP2009089188 dated Apr. 23, 2009 (2 pages).
Samsung; "Views on the feedback framework for Rel. 10"; 3GPP TSG RAN WG1 Meeting #61, R1-103377; Montreal, Canada, May 10-14, 2010 (17 pages).
Samsung; "Control signaling to support Rel. 10 feedback framework"; 3GPP TSG RAN WG1 Meeting #61bis, R1-103667; Dresden Germany, Jun. 28-Jul. 2, 2010 (13 pages).
International Search Report issued in PCT/JP2011/068458 mailed Sep. 13, 2011 (2 pages).
Huawei; "Double codebook based Differential feedback for MU-MIMO enhancement"; 3GPP TSG RAN WG1 meeting #61bis, R1-103449; Dresden, Germany; Jun. 28-Jul. 2, 2010 (10 pages).
NTT DOCOMO; "Views on CSI Feedback Signaling on PUSCH/PUCCH"; 3GPP TSG RAN WG1 Meeting #62, R1-104934; Madrid, Spain; Aug. 23-27, 2010 (7 pages).
3GPP TR 25.913 V8.0.0; "3rd Generation Partnership Project; Technical Specification Group Radio Access Nework; Requirements for Evolved UTRA (E-UTRA) and Evolved UTRAN (E-TRAN) (Release 8)"; Dec. 2008 (18 pages).

* cited by examiner $$\begin{bmatrix} 1 & 1 & 1 & 1 & 1 & 1 & 1 & 1 \\ 1 & \omega & \omega^2 & \omega^3 & \omega^4 & \omega^5 & \omega^6 & \omega^7 \\ 1 & \omega^2 & \omega^4 & \omega^6 & \omega^8 & \omega^{10} & \omega^{12} & \omega^{14} \\ 1 & \omega^3 & \omega^6 & \omega^9 & \omega^{12} & \omega^{15} & \omega^{18} & \omega^{21} \end{bmatrix}$$

$$= \begin{bmatrix} f_0 & f_1 & f_2 & f_3 & f_4 & f_5 & f_6 & f_7 \end{bmatrix}$$

INDEXING : 000   001   010   011   100   101   110   111

$$\begin{bmatrix} 1 & 1 & 1 & 1 & 1 & 1 & 1 & 1 \\ 1 & \omega & \omega^2 & \omega^3 & \omega^4 & \omega^5 & \omega^6 & \omega^7 \\ 1 & \omega^2 & \omega^4 & \omega^6 & \omega^8 & \omega^{10} & \omega^{12} & \omega^{14} \\ 1 & \omega^3 & \omega^6 & \omega^9 & \omega^{12} & \omega^{15} & \omega^{18} & \omega^{21} \end{bmatrix}$$

$$= \begin{bmatrix} f_0 & f_1 & f_2 & f_3 & f_4 & f_5 & f_6 & f_7 \end{bmatrix}$$

INDEXING: 000 001 010 011 100 101 110 111

INDEXING: 000 001 <u>011</u> <u>010</u> <u>110</u> <u>111</u> <u>101</u> <u>100</u>

FIG.5

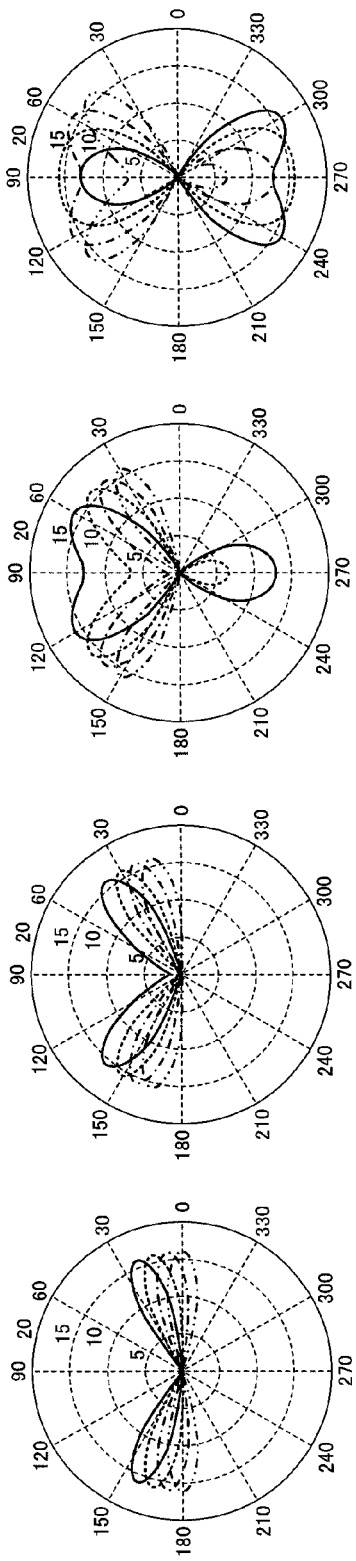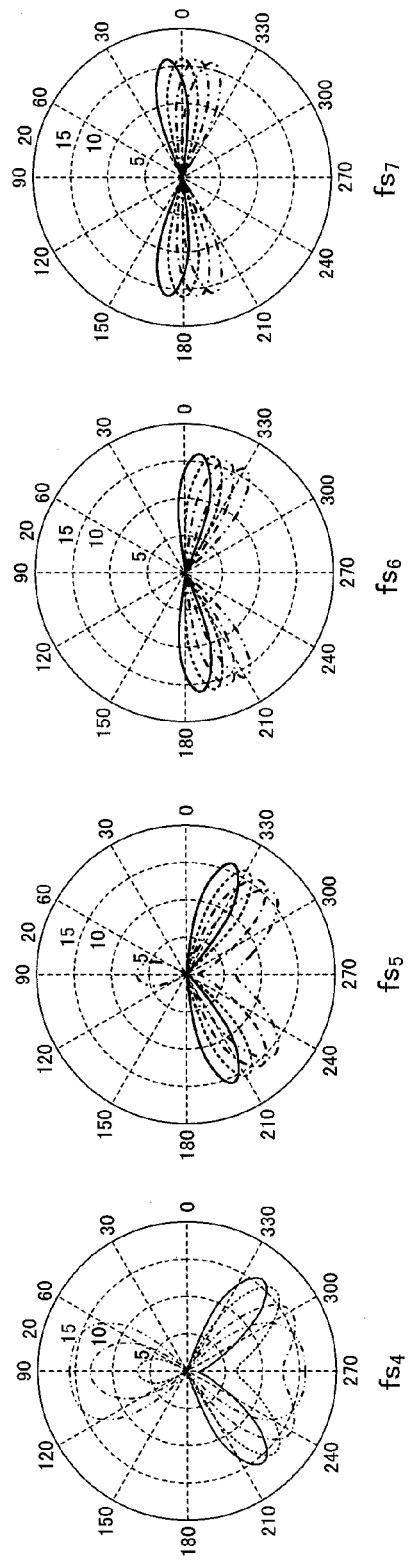
FIG.7D  FIG.7H
FIG.7C  FIG.7G
FIG.7B  FIG.7F
FIG.7A  FIG.7E

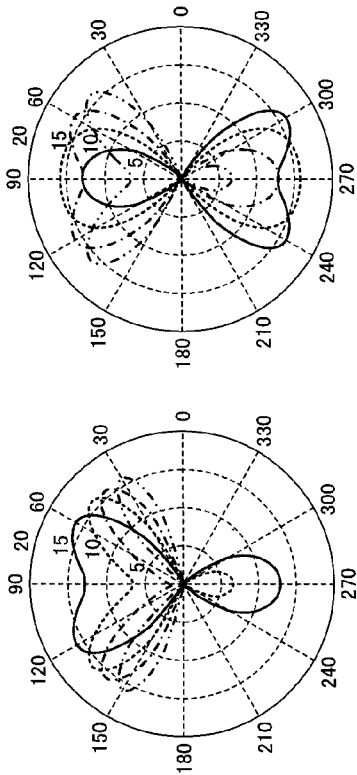
FIG.8D $fs_3:011$
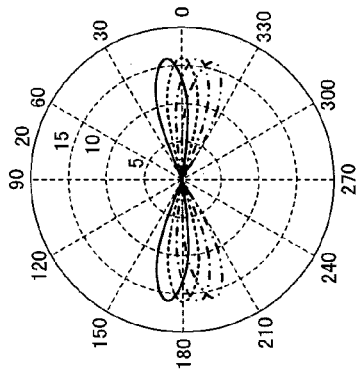
FIG.8H $fs_7:111$
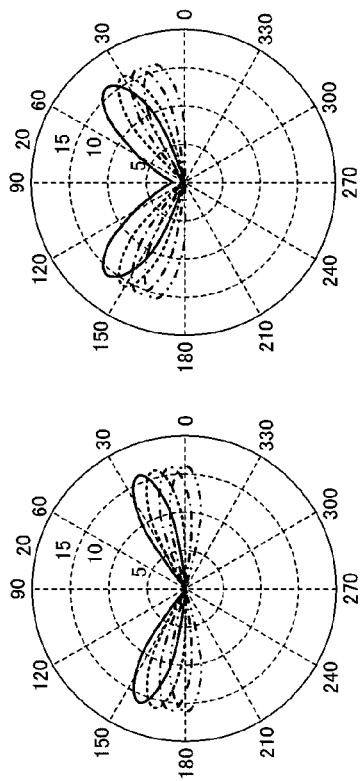
FIG.8C $fs_2:010$
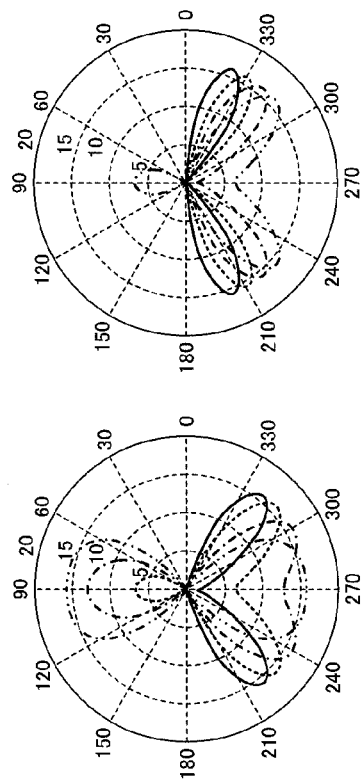
FIG.8G $fs_6:110$
FIG.8B $fs_1:001$
FIG.8F $fs_5:101$
FIG.8A $fs_0:000$
FIG.8E $fs_4:100$

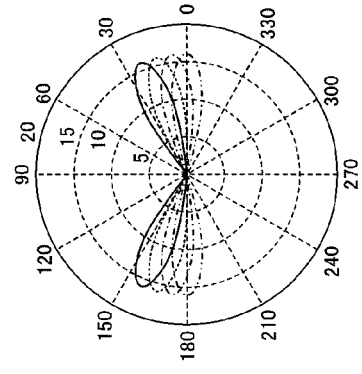
FIG.9A $fs_0:000$
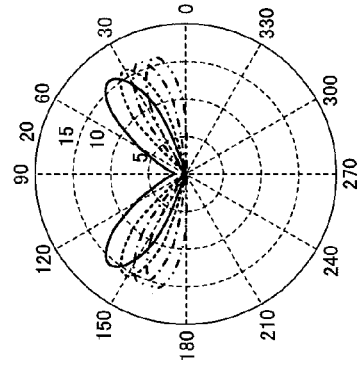
FIG.9B $fs_1:001$
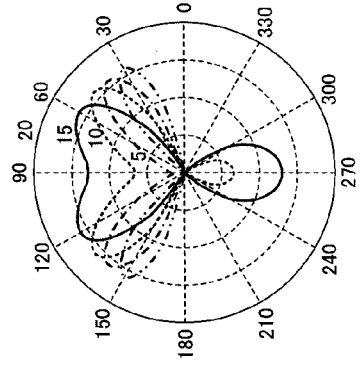
FIG.9C $fs_2:011$
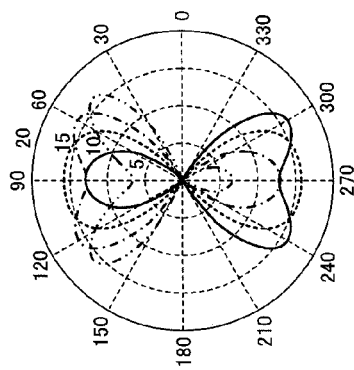
FIG.9D $fs_3:010$
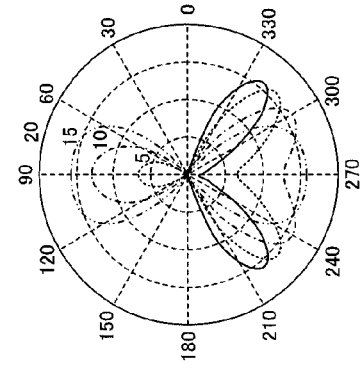
FIG.9E $fs_4:110$
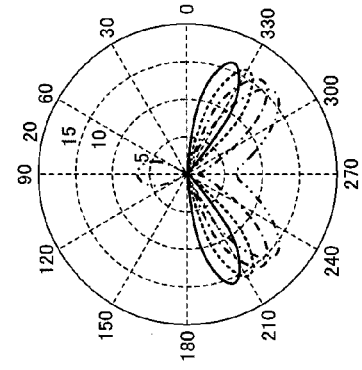
FIG.9F $fs_5:111$
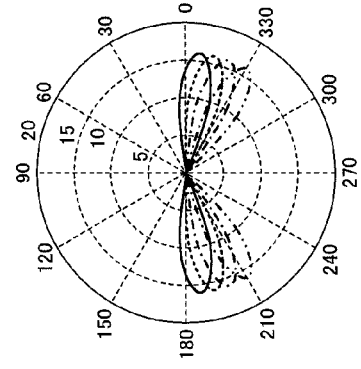
FIG.9G $fs_6:101$
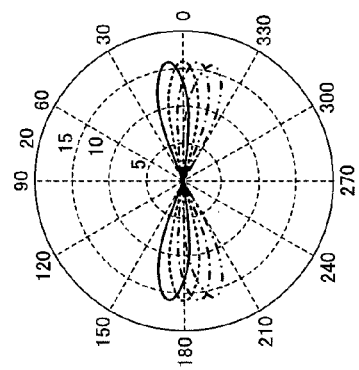
FIG.9H $fs_7:100$

COMMUNICATION CONTROL METHOD, BASE STATION APPARATUS AND MOBILE STATION APPARATUS

TECHNICAL FIELD

The present invention relates to a communication control method, a base station apparatus and a mobile station apparatus. Particularly, the present invention relates to a communication control method, a base station apparatus and a mobile station apparatus all supporting multi-antenna transmission.

BACKGROUND ART

In a UMTS (Universal Mobile Telecommunications System) network, for the purposes of improving spectral efficiency and improving the data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study.

In a third-generation system, it is possible to achieve a transmission rate of maximum approximately 2 Mbps on the downlink by using a fixed band of approximately 5 MHz. Meanwhile, in the LTE system, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems to LTE have been under study (for example, LTE Advanced (LTE-A)). For example, in LTE-A, there is a plan to extend the maximum system band of 20 MHz specified in LTE up to about 100 MHz. And, there is another plan to increase the maximum number of transmission antennas specified in LTE up to "8".

In the LTE system, there has been proposed a MIMO (Multi Input Multi Output) system as a radio communication technique for improving data rates (spectrum efficiency) by transmitting and receiving data with use of a plurality of antennas (for example, see Non Patent Literature 1). In the MIMO system, a plurality of transmission/reception antennas are provided in a transmitter and a receiver and transmission information sequences are transmitted from different transmission antennas simultaneously. In the meantime, at the receiver side, simultaneously-transmitted information sequences are detected in a separate manner in consideration of different fading fluctuations caused in the respective transmission/reception antennas, thereby enabling increase in data rates (spectrum efficiency).

In the LTE system, there are specified SU-MIMO (Single User MIMO) transmission and MU-MIMO (Multiple User MIMO) transmission. In SU-MIMO transmission, the transmission information sequences that are simultaneously transmitted from different transmission antennas all belong to one user and in MU-MIMO transmission, the transmission information sequences belong to different users. In these SU-MIMO transmission and MU-MIMO transmission, a codebook is prepared for setting a phase/amplitude control amount (precoding matrix (precoding weight)) for an antenna of a transmitter at the receiver side and PMI (Precoding Matrix Indicators) to be assigned to the precoding matrix according to rank, an optimum PMI is selected from the codebook and fed back to the transmitter, and a RI (Rank Indicator) indicating the optimum rank is selected and fed back to the transmitter. At the transmitter side, the PMI and RI fed back from the receiver are used as a basis to specify a precoding weight for each transmission antenna from the codebook, performing precoding and transmitting transmission information sequences.

CITATION LIST

Non Patent Literature

Non-Patent Literature 1: 3GPP, TR25.913, "Requirements for Evolved UTRA and Evolved UTRAN"

SUMMARY OF THE INVENTION

Technical Problem

In the above-described MIMO transmission-supported mobile communication system, throughput performance of the whole system largely depends on the precoding weight defined in the codebook. That is, a transmission beam to transmit a transmission information sequence from the transmitter to the receiver has directivity determined by the precoding weight. Therefore, if the optimum precoding weight is not selected, it becomes difficult to form the transmission beam having effective directivity for the receiver. Such a transmission beam may cause false detection of reception signals at the receiver, thereby decreasing the throughput performance. As a result, there may occur deterioration of the throughput performance of the whole MIMO system.

The present invention was carried out in view of the foregoing and aims to provide a communication control method, a base station apparatus and a mobile station apparatus capable of preventing deterioration of the throughput performance of the whole system in the mobile communication system performing the MIMO transmission.

Solution to Problem

The present invention provides a communication control method using a codebook in which there are defined a plurality of precoding weights and a plurality of PMIs (Precoding Matrix Indicators) assigned to the precoding weights and bit information of the PMIs assigned to the precoding weights is adjusted in such a manner as to suppress an effect of feedback error from a first communication apparatus, the communication control method comprising the steps of: giving, as feedback, the PMI selected from the codebook to a second communication apparatus; performing precoding on a transmission signal based on the precoding weight to which the fed-back PMI is assigned on the codebook; and transmitting the transmission signal to the first communication apparatus.

Further, the present invention provides a base station apparatus comprising: a selecting section configured to select a precoding weight from a codebook in which there are defined a plurality of precoding weights and a plurality of PMIs (Precoding Matrix Indicators) assigned to the precoding weights; a precoding section configured to perform precoding on a transmission signal based on the precoding weight selected by the selecting section; a transmitting section configured to transmit, to a mobile station apparatus, the transmission signal on which the precoding is performed by the precoding section, wherein bit information of the PMIs assigned to the precoding weights in the codebook is adjusted in such a manner as to suppress an effect of feedback error from the mobile station apparatus.

Furthermore, the present invention provides a mobile station apparatus comprising: a selecting section configured to select a PMI (Precoding Matrix Indicator) from a codebook in which there are defined a plurality of precoding weights and a plurality of PMIs assigned to the precoding weights; and a feedback section configured to giving, as feedback, the PMI selected by the selecting section to a base station apparatus, wherein bit information of the PMIs assigned to the precoding weights in the codebook is adjusted in such a manner as to suppress an effect of feedback error to the base station apparatus.

According to these method and apparatuses, the PMI bit information assigned to precoding weights in the codebook is adjusted in such a manner as to suppress any effect due to feedback error from the mobile station apparatus (feedback error to the base station apparatus). With this structure, even when there occurs error in feedback from the mobile station apparatus, it is possible to prevent precoding from being performed with a precoding weight that is extremely different from a proper precoding weight. Therefore, it becomes possible to prevent serious reduction in throughput in the mobile station apparatus, thereby making it possible to preventing deterioration of the throughput performance of the whole system in the mobile communication system performing MIMO transmission.

Technical Advantage of the Invention

According to the present invention, it is possible to prevent deterioration of throughput performance of the whole system in the mobile communication system performing MIMO transmission.

BRIEF DESCRIPTION OF DRAWINGS

FIG. 5 is an explanatory diagram of a structural example of PMIs and precoding weights of the codebook used in the communication control method according to a first aspect of the present invention;

FIG. 7 provides explanatory diagrams of structural examples of transmission beams formed by a weight subset selected from a first codebook that makes up a double codebook;

FIG. 8 provides explanatory diagrams of structural examples of PMIs to be assigned to weight subsets selected from the first codebook that makes up the double codebook;

FIG. 9 provides explanatory diagrams of structural examples of PMIs assigned to the first codebook used in the communication control method according to the first aspect;

DESCRIPTION OF EMBODIMENTS

Figure 1:
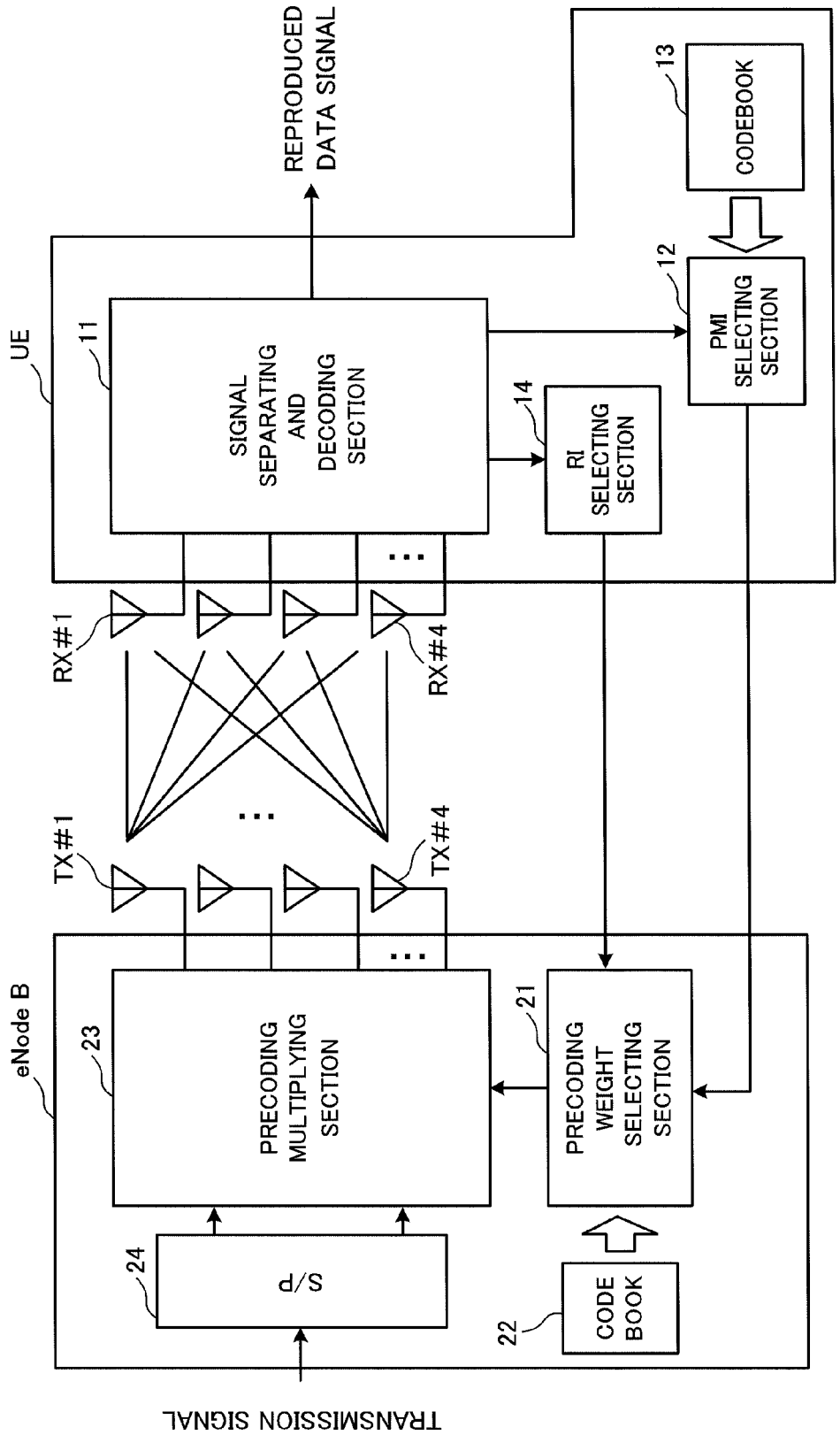
FIG. 1 is a conceptual diagram of the MIMO system to which a communication control method according to the present invention is applied.

With reference to the accompanying drawings, an embodiment of the present invention will be described in detail below. First description is made about precoding in downlink MIMO transmission performed in the LTE-A system, predicated on a mobile communication system performing MIMO transmission (MIMO system) illustrated in FIG. 1. FIG. 1 is a conceptual diagram of the MIMO system to which a communication control method according to the present invention is applied. In the MIMO system illustrated in FIG. 1, it is assumed that each of a base station apparatus eNode B and a user apparatus (UE: User Equipment) has four antennas.

In precoding in downlink MIMO transmission of the MIMO system illustrated in FIG. 1, the user apparatus UE measures a channel variance with use of a reception signal from each antenna and uses the measured channel variance on a basis to select a PMI (Precoding Matrix Indicator) and an RI (Rank Indicator) corresponding to such a phase and amplitude control amount (precoding weight) that the throughput (or reception SINR) of combined transmission data from respective transmission antennas of the base station apparatus eNode B is maximized. Then, the selected PMI and RI are fed back to the base station apparatus eNode B on the uplink. The base station apparatus eNode B uses as a basis the PMI and RI fed back from the user apparatus UE to perform precoding on the transmission data and sent information from the respective antennas.

In the user apparatus UE illustrated in FIG. 1, a signal separating and decoding section 11 performs separating and decoding of control channel signals and data signals contained in reception signals received via reception antennas RX #1 to RX #4. With the decoding processing performed by the signal separating and decoding section 11, data channel signals are reproduced for the user apparatus UE. A PMI selecting section 12 selects a PMI in accordance with a channel state estimated by a channel estimating section (not shown). Then, the PMI selecting section 12 selects the optimal PMI from a codebook 13 in which there are defined, according to rank, N precoding weights (hereinafter also referred to as "weight" as appropriate) that are already known to the user apparatus UE and the base station apparatus eNode B and PMIs to be assigned to selects an RI in accordance with the channel state estimated by the channel estimating section. These PMI and RI are transmitted as feedback information to the base station apparatus eNode B.

In the meantime, in the base station apparatus eNode B illustrated in FIG. 1, a precoding weight selecting section 21 selects a weight for each transmission antenna from a codebook 22 based on the PMI and RI fed back from the user apparatus UE, or generates a weight suitable for the user apparatus UE based on the selected weight. A precoding multiplying section 23 receives a transmission signal which is parallel-converted by a serial/parallel converting section (S/P) 24, and multiplies the transmission signal by a weight thereby to control (shift) phase and amplitude for each of transmission antennas TX #1 to TX #4. With this structure, the phase/amplitude shifted transmission data is transmitted from the four transmission antennas TX #1 to TX #4. In this way, as the phase and amplitude shift is performed on the transmission data by a weight based on the PMI and RI fed back from the user apparatus UE, it is possible to form a transmission beam having effective directivity toward the user apparatus UE.

Figure 2:
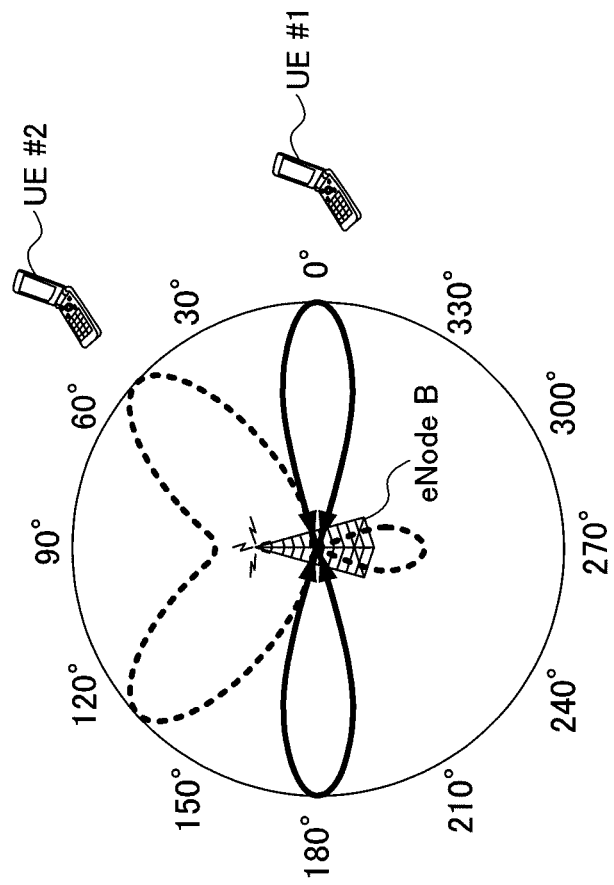
FIG. 2 is an explanatory diagram of a structure of a transmission beam to be transmitted from a base station apparatus to a user apparatus.

Here, description is made about a structure of the transmission beam to be transmitted from the base station apparatus eNode B to the user apparatus UE in this downlink MIMO transmission. FIG. 2 is an explanatory diagram of the configuration of the transmission beam to be transmitted from the base station apparatus eNode B to the user apparatus UE in the downlink MIMO transmission. Here, in FIG. 2, it is assumed that the base station apparatus eNode B is placed at the center, the right side and left side in the diagram are indicated by 0 degree and 180 degree, respectively, and the upper side and the lower side are indicated by 90 degrees and 270 degrees, respectively. In FIG. 2, the user apparatus UE #1 is placed almost in a 0-degree direction from the base station apparatus eNode B and the user apparatus UE #2 is placed almost in a 60-degree direction from the base station apparatus eNode B.

When information is transmitted to the user apparatus UE #1, the precoding weight selecting section 21 selects such a weight as to form a transmission beam with a directivity as shown by the solid line in FIG. 2 from the codebook 22 and performs precoding. In the meantime, when information is transmitted to the user apparatus UE #2, selects such a weight as to form a transmission beam with a directivity as shown by the broken line in FIG. 2 from the codebook 22 and performs precoding.

Figures 3A, 3B:
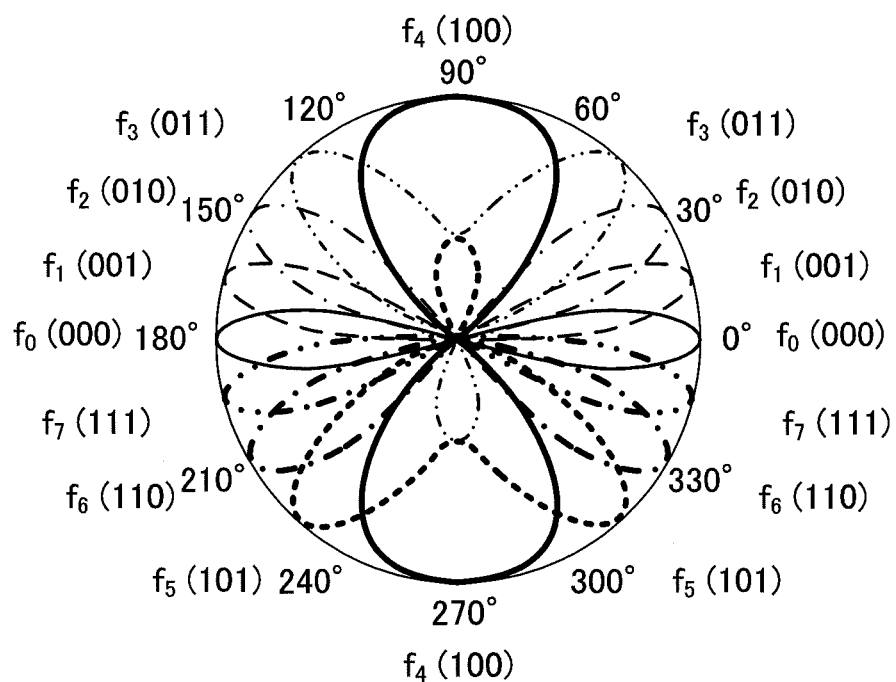
FIG. 3 provides explanatory diagrams illustrating precoding weights defined in a typical codebook used in downlink MIMO transmission and transmission beams formed by these precoding weights.

Here, description is made, with reference to FIG. 3, about weights defined in a typical codebook used in this downlink MIMO transmission and the structure of a transmission beam formed by such a weight. In FIG. 3A, there are shown weights defined in a typical codebook used in downlink MIMO transmission and PMIs assigned to these weights. And, in FIG. 3B, there is shown a structure of a transmission beam formed by each weight in FIG. 3A.

In FIG. 3A, the codebook is composed of a DFT (Discrete Fourier Transform) matrix having 8 lines x columns and a part of the codebook is shown (upper 4 lines are shown for 4 transmission antennas). Each line illustrated in FIG. 3A corresponds to a transmission antenna provided in the base station apparatus eNode B and each column illustrated in FIG. 3A corresponds to a transmission stream from the base station apparatus eNode B. In the following description, weight groups corresponding to the respective columns are referred to as "$f_0$" to "$f_7$".

In the codebook illustrated in FIG. 3A, the weights $f_0$ to $f_7$ are assigned with PMIs, each of which is composed of bit information of 3 bits. That is, the weight $f_0$ is assigned with "000", the weight $f_1$ is assigned with "001", the weight $f_2$ is assigned with "010" and the weight $f_3$ is assigned with "011". And, the weight $f_4$ is assigned with "100", the weight $f_5$ is assigned with "101", the weight $f_6$ is assigned with "110" and the weight $f_7$ is assigned with "111".

For example, transmission beams formed by the base station apparatus eNode B with use of the weights $f_0$ to $f_7$ have directivities as shown in FIG. 3B. That is, when the weight $f_0$ is used, there is formed a transmission beam having a directivity in the 0-degree direction and a directivity in the 180-degree direction (indicated by the thin solid line in FIG. 3B). When the weight $f_1$ is used, there is formed a transmission beam having a directivity in the 15-degree direction and a directivity in the 165-degree direction (indicated by the thin broken line in FIG. 3B). When the weight $f_2$ is used, there is formed a transmission beam having a directivity in the 30-degree direction and a directivity in the 150-degree direction (indicated by the thin dashed line in FIG. 3B). When the weight $f_3$ is used, there is formed a transmission beam having a directivity in the 50-degree direction and a directivity in the 130-degree direction (indicated by the chain double-dashed line in FIG. 3B). When the weight $f_4$ is used, there is formed a transmission beam having a directivity in the 90-degree direction and a directivity in the 270-degree direction (indicated by the thick solid line in FIG. 3B). When the weight $f_5$ is used, there is formed a transmission beam having a directivity in the 230-degree direction and a directivity in the 310-degree direction (indicated by the thick broken line in FIG. 3B). When the weight $f_6$ is used, there is formed a transmission beam having a directivity in the 210-degree direction and a directivity in the 330-degree direction (indicated by the thick dashed line in FIG. 3B). When the weight $f_7$ is used, there is formed a transmission beam having a directivity in the 195-degree direction and a directivity in the 345-degree direction (indicated by the thick chain double-dashed line in FIG. 3B).

The weights used in forming of these transmission beams are selected or generated in the base station apparatus eNode B based on the PMI fed back from the user apparatus UE. Therefore, if there occurs transmission error in bit information that makes up the PMI (hereinafter referred to as "PMI bit information" as appropriate) from the user apparatus UE (that is, when there occurs feedback error in PMI), there may occur a situation where a transmission beam with a desired directivity cannot be formed. Although the PMI is fed back from the user apparatus UE by PUCCH (Physical Uplink Control CHannel), this PUCCH is not subjected to error detection using CRC (Cyclic Redundancy Check). Therefore, if there occurs feedback error in the PMI, the PMI is subjected to processing in the base station apparatus eNode B while it still contains wrong bit information.

Figure 4:
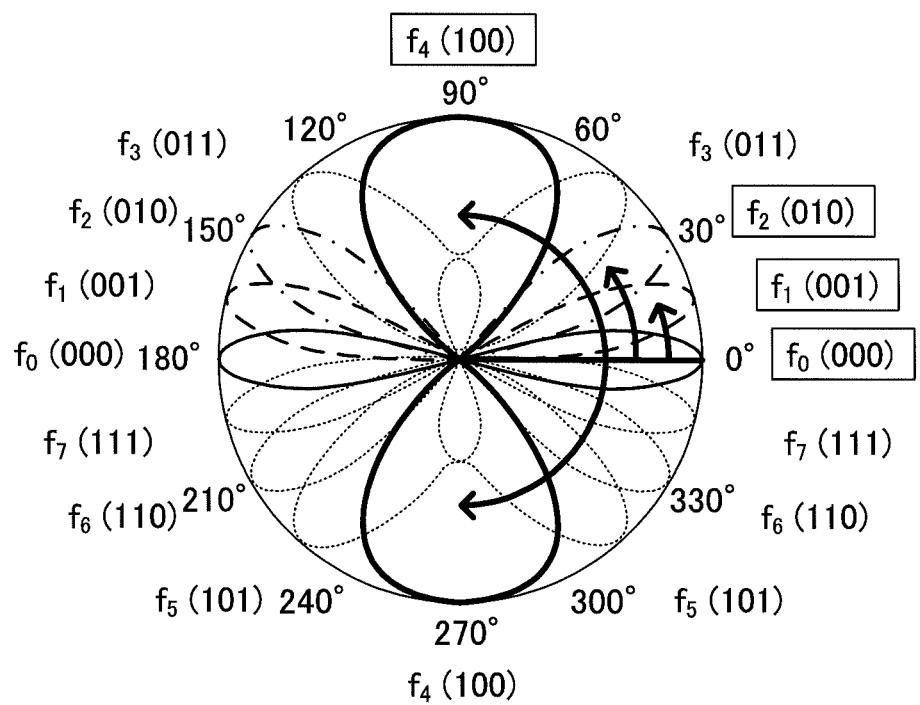
FIG. 4 is an explanatory diagram of structural examples of transmission beams when there occurs a transmission error in PMI bit information fed back from a user apparatus using the typical codebook.

With reference to FIG. 4, description is made about structural examples of transmission beams when there occurs transmission error in PMI bit information from the user apparatus UE. FIG. 4 is an explanatory diagram of the structural examples of transmission beams when there occurs transmission error in PMI bit information fed back from the user apparatus UE using the typical codebook. Here, it is assumed that the transmission beam formed with the weight $f_0$ is a desired transmission beam. As described above, the weight $f_0$ is assigned with PMI bit information "000".

Here, description is made about the transmission beam which is formed when there occurs transmission error in one bit out of the PMI bit information "000" assigned to the weight $f_0$. If there occurs transmission error in the right bit, the PMI bit information becomes "001" and there is formed a transmission beam corresponding to the transmission beam properly formed with the weight $f_1$. And, when there occurs transmission error in the center bit the PMI bit information becomes "010" and there is formed a transmission beam corresponding to the transmission beam properly formed with the weight $f_2$. When there occurs transmission error in the left bit the PMI bit information becomes "100" and there is formed a transmission beam corresponding to the transmission beam properly formed with the weight $f_4$.

When there occurs transmission error in right bit or center bit, as illustrated in FIG. 4, there is formed a transmission beam having a directivity close to a desired transmission beam. Accordingly, the error detection rate of the reception signal in the user apparatus UE is low, resulting in some reduction in throughput. However, when there occurs transmission error in the left bit, there is formed a transmission beam having directivity that is different from the directivity of the desired transmission beam. Such a transmission beam causes error detection of the reception signal in a desired user apparatus UE (the user apparatus UE positioned close to the area in the 0-degree direction from the base station apparatus eNode B), resulting in reduction in throughput. In other words, such transmission beam does not have an effective directivity for the desired user apparatus UE and reception power (gain) required to demodulate the reception signal appropriately may become insufficient. Therefore, in the user apparatus UE, the reception signal cannot be demodulated appropriately and the reception signal is detected in error, resulting in reduction in throughput. As the throughput in the desired user apparatus UE is thus reduced, the throughput performance of the whole MIMO system is deteriorated.

This situation mostly depends on arrangement of PMI bit information assigned to a weight. That is, in the typical codebook, the PMI bit information assigned to respective weights is written in so-called binary in ascending order, as illustrated in FIG. 3A. When the PMI bit information is thus assigned, transmission error in one bit may cause reduction in throughput in a desired user apparatus UE. The present inventors have noted that the arrangement of PMI bit information assigned to weights thus causes reduction in throughput performance of the MIMO system and finally completed the present invention.

According to the communication control method according to the present invention, feedback from a user apparatus UE to a base station apparatus eNode B and precoding of a transmission signal from the base station apparatus eNode B to the user apparatus UE are performed using a codebook in which PMI bit information assigned to weights is adjusted in such a manner as to suppress any effect of feedback error from the user apparatus UE. According to this communication control method, even if there occurs feedback error from the user apparatus UE, it is possible to prevent precoding from being performed with a weight that is extremely different from a proper weight. With this structure, as it is possible to prevent significant reduction in throughput in the user apparatus UE, it becomes possible to prevent deterioration in the throughput performance in the whole system in the mobile communication system performing MIMO transmission.

Particularly, according to the communication control method according to the present invention, the PMI bit information assigned to weights in the codebook is adjusted in such a manner as to suppress any effect of a transmission beam formed based on a PMI having feedback error. Accordingly, even when there occurs feedback error from the user apparatus UE, it is possible to prevent forming of transmission beam that is extremely different from a transmission beam formed with the proper weight. With this structure, as it is possible to prevent significant reduction in throughput in the user apparatus UE, it becomes possible to prevent deterioration in the throughput performance in the whole system in the mobile communication system performing MIMO transmission.

FIG. 5 is an explanatory diagram of a structural example of weights defined in codebook used in the communication control method according to the first aspect of the present invention and PMIs (PMI bit information) assigned to these weights. In FIG. 5, for convenience of explanation, shown are the PMIs (PMI bit information) in the typical codebook illustrated in FIG. 3. Here, in FIG. 5, the codebook used in the communication control method according to the present invention is given by way of example and is not intended for limiting the present invention.

As illustrated in FIG. 5, in the codebook used in the communication control method according to the first aspect (codebook according to the first aspect), the PMI bit information is assigned to the weights $f_0$ to $f_7$ not in so-called binary in ascending order, but in gray coding. Here, gray coding is a coding method of arranging codes (that is, PMI bit information) in such a manner that Hamming distance between adjacent codes always becomes 1.

Specifically speaking, in the codebook according to the first aspect, the PMI bit information of the weight $f_2$ is assigned with the PMI bit information "011" of the weight $f_3$ shown in FIG. 3, and the PMI bit information of the weight $f_3$ is assigned with the PMI bit information "010" of the weight $f_2$ shown in FIG. 3. Besides, the PMI bit information of the weight $f_4$ is assigned with the PMI bit information "110" of the weight $f_6$ shown in FIG. 3 and the PMI bit information of the weight $f_5$ is assigned with the PMI bit information "111" of the weight $f_7$ shown in FIG. 3. Further, the PMI bit information of the weight $f_6$ is assigned with the PMI bit information "101" of the weight $f_5$ shown in FIG. 3 and the PMI bit information of the weight $f_7$ is assigned with the PMI bit information "100" of the weight $f_4$ shown in FIG. 3. Here, as to the weights $f_0$ and $f_1$, the same PMI bit information pieces "000" and "001" are assigned. As the PMI bit information is thus assigned to the weights $f_0$ to $f_7$, the Hamming distance of PMI bit information assigned to weights adjacent to each other on the codebook always becomes 1.

Figure 6:
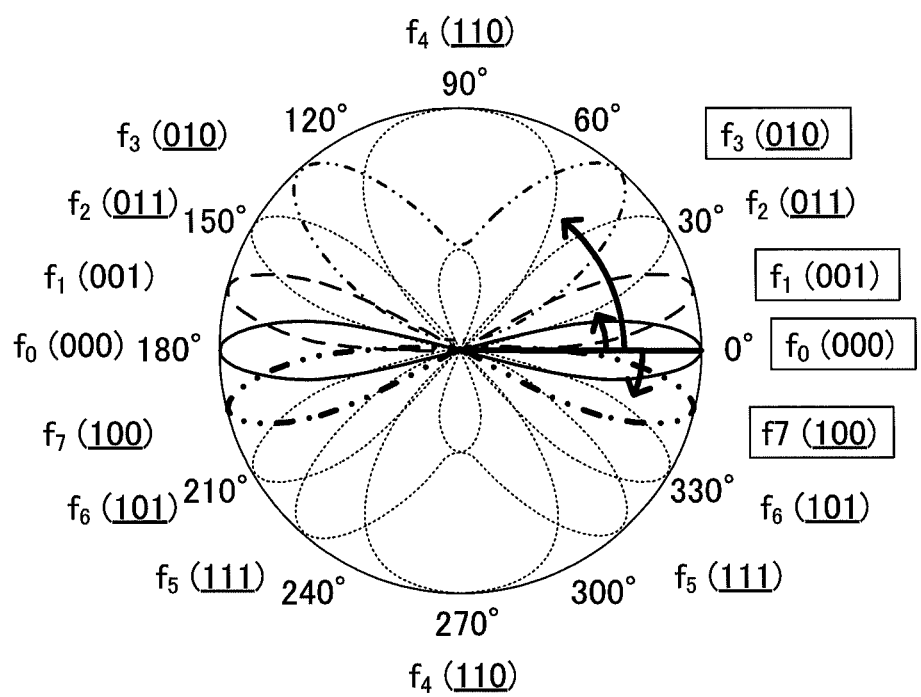
FIG. 6 is an explanatory diagram of structural examples of transmission beams when there occurs a transmission error in PMI bit information fed back from a user apparatus using the codebook adopted in the communication control method according to the first aspect.

With reference to FIGS. 4 and 6, description is made about a structural example of a transmission beam formed using the codebook according to the first aspect when there occurs transmission error in PMI bit information fed back from the user apparatus UE. FIG. 6 is an explanatory diagram of a structural example of a transmission beam formed using the codebook according to the first aspect when there occurs transmission error in PMI bit information fed back from the user apparatus UE. Here, like in FIG. 4, it is assumed that a transmission beam formed with the weight $f_0$ is a desired transmission beam.

Here, like in FIG. 4, description is made about the transmission beam formed when there occurs transmission error in one bit out of the PMI bit information "000" assigned to the weight $f_0$. If there occurs transmission error in the right bit, like in FIG. 4, there is formed a transmission beam corresponding to a transmission beam formed with the weight $f_1$. In the meantime, when there occurs transmission error in the center bit, the PMI bit information becomes "010" and there is formed a transmission beam corresponding to a transmission beam properly formed with the weight $f_3$. In the meantime, when there occurs transmission error in the left bit, the PMI bit information is "100" and there is formed a transmission beam corresponding to a transmission beam properly formed the weight $f_7$.

That is, when using the codebook according to the first aspect, it is possible to prevent forming of a transmission beam with a directivity that is extremely different from that of a transmission beam formed with the proper weight $f_0$, even when there occurs transmission error in PMI bit information, as compared with the case of using the codebook illustrated in FIG. 3. With this structure, as it is possible to reduce the error detection rate of the reception signal in the desired user apparatus UE (user apparatus UE positioned close to the 0-degree direction area from the base station apparatus eNode B), it is possible to prevent reduction in throughput in the user apparatus UE. Consequently, it is possible to prevent deterioration of the throughput performance of the whole MIMO system.

By the way, in the LTE-A based MIMO system, as a technique showing expectation for reduction in quantization error of the quantization processing of the user apparatus UE in MU-MIMO transmission and reduction in feedback information for the base station apparatus eNode B, there has been studied a method of preparing two codebooks (hereinafter referred to as "double codebooks") in the user apparatus UE and the base station apparatus eNode B and giving back feedback information containing PMIs with different periods for different communication bands.

In the MIMO system using this double codebooks, it is planned to use one codebook as a first codebook for long term and wide band (hereinafter referred to as "codebook W1") and the other codebook as a second codebook for short term and narrow band (hereinafter referred to as "codebook W2"). In this MIMO system, as the two codebooks W1 and W2 are provided, an effective codebook size can be increased, thereby expecting reduction in quantization error in the quantization processing of the user apparatus UE. Besides, in the codebook W1, it is not necessary to give back feedback information frequently as compared with the codebook W2, there is expectation for reduction in feedback information.

The codebooks W1 and W2 contain a plurality of weights known to both the user apparatus UE and the base station apparatus eNodeB and PMIs assigned to respective weights, like the typical codebook (codebook illustrated in FIG. 3, for example). In the base station apparatus eNode B, a weight for each transmission antenna is selected from the codebooks W1 and W2 based on a PMI fed back from the user apparatus UE, precoding is performed on transmission data with this weight and information data is transmitted from each antenna.

In the MIMO system using the double codebooks, the base station apparatus eNode B is able to specify a weight for precoding on transmission data when both of the PMI selected from the codebook W1 (hereinafter referred to as "$PMI_1$") and the PMI selected from the codebook W2 (hereinafter referred to as "$PMI_2$") are fed back from the user apparatus UE. That is, the base station apparatus eNode B cannot specify a weight only based on any one PMI out of ($PMI_1$, $PMI_2$) selected from the codebooks W1 and W2.

In the thus used codebooks W1, W2, if there occurs transmission error in PMI bit information from the user apparatus UE, there may occur a situation where it is impossible to form a transmission beam with a desired directivity. The codebook according to the first aspect is applicable to such double codebooks. The following is description about a specific example where the codebook according to the first aspect is applied to the double codebooks.

In the following description, it is assumed that the codebook W1 defines N weight sets known to both of the user apparatus UE and the base station apparatus eNode B (hereinafter referred to as "weight subsets") and $PMI_1$s assigned to these weight subsets, and the codebook W2 defines weights that have an effect to select and make phase control of a certain weight out of the weight subset defined in the codebook W1 and $PMI_2$s assigned to these weights. Here, the weight subsets are such that all the weights defined in the codebook W1 are grouped into a predetermined number of groups. In this case, in the base station apparatus eNode B, a weight subset is selected based on the $PMI_1$ given back from the user apparatus UE for a long term and an optimal weight is selected from the weight subset in accordance with the $PMI_2$ given back for a short term thereby to be able to make phase control.

FIG. 7 provides explanatory diagrams of structural examples of transmission beams formed with weight subsets each selected from the first codebook W1. In FIG. 7, all the weights (16 weights) defined in the codebook W1 are classified into 8 groups to compose the weight subsets. Here, adjacent weight subsets contain two same weights redundantly. In FIGS. 7A to 7H, there are shown transmission beams that are formed with respective weight subsets selected from the codebook W1. Transmission beams formed with each weight subset contain four transmission beams with directivities. In the following description, the weight subsets in FIGS. 7A to 7H are referred to as "$fs_0$" to "$fs_7$".

When the $PMI_1$ selected from the codebook W1 is given back from the user apparatus UE, in the base station apparatus eNode B, a weight subset for forming transmission beams shown in any one of FIGS. 7A to 7H is selected. Then, the $PMI_2$ selected from the codebook W2 is given back from the user apparatus, in the base station apparatus eNode B, an optimal weight is selected from the weight subset. For example, when the $PMI_1$ corresponding to a weight subset for forming transmission beams shown in FIG. 7C is given back and then, the $PMI_2$ is given back, a weight forming any of transmission beams shown in FIG. 7C is selected.

When each weight subset of the codebook W1 is assigned with PMI bit information in so-called binary in ascending order, such PMI bit information is given as illustrated in FIG. 8. That is, the weight subset $fs_0$ is assigned with "000", the weight subset $fs_1$ is assigned with "001", the weight subset $fs_2$ is assigned with "010", the weight subset $fs_3$ is assigned with "011", the weight subset $fs_0$ is assigned with "100", the weight subset $fs_5$ is assigned with "101", the weight subset $fs_6$ is assigned with "110", and the weight subset $fs_7$ is assigned with "111".

Here, description is made about an effect when there occurs transmission error in PMI bit information corresponding to a weight subset from the user apparatus UE. In this description, it is assumed that the weight subset $fs_0$ is a desired weight subset. And, description is given about transmission beams formed when there occurs transmission error in one bit of the PMI bit information "000" assigned to the weight subset $fs_0$.

Even if there occurs transmission error in the right bit, the PMI bit information becomes "001" and there is formed a transmission beam corresponding to a transmission beam properly formed with the weight subset $fs_1$. And, when there occurs transmission error in the center bit, the PMI bit information becomes "010" and there is formed a transmission beam corresponding to a transmission beam properly formed with the weight subset $fs_2$. Further, when there occurs transmission error in the left bit, the PMI bit information becomes "100" and there is formed a transmission beam corresponding to a transmission beam properly formed with the weight subset $fs_4$.

When there occurs transmission error in the right bit, as illustrated in FIG. 8B, there is formed a transmissions beam having a directivity analogous to that of desired transmission beam (transmission beam illustrated in FIG. 8A). Accordingly, the error detection rate of reception signals in the user apparatus UE is low, thereby preventing serious reduction in throughput. However, when there occurs transmission error in the center or left bit, as illustrated in FIG. 8C or 8E, there are formed transmission beams having directivities different from the directivity of the desired transmission beam (transmission beam shown in FIG. 8A), which results in increase in error detection rate of reception signals in the user apparatus UE and significant decrease in throughput.

The weight subsets $fs_0$ to $fs_7$ defined in the codebook W1 used in the communication control method according to the first aspect are assigned with PMI bit information as illustrated in FIG. 9. Assignment of these PMI bit information pieces is performed by gray coding like in the case shown in FIG. 5. That is, the PMI bit information of the weight subset $fs_2$ is assigned with PMI bit information "011" of the weight subset $fs_3$ shown in FIG. 8, the PMI bit information of the weight subset $fs_3$ is assigned with PMI bit information "010" of the weight subset $fs_2$ shown in FIG. 8, the PMI bit information of the weight subset $fs_4$ is assigned with PMI bit information "110" of the weight subset $fs_6$ shown in FIG. 8, the PMI bit information of the weight subset $fs_6$ is assigned with PMI bit information "111" of the weight subset $fs_7$ shown in FIG. 8, the PMI bit information of the weight subset $fs_6$ is assigned with PMI bit information "101" of the weight subset $fs_5$ shown in FIG. 8, and the PMI bit information of the weight subset $fs_7$ is assigned with PMI bit information "100" of the weight subset $fs_0$ shown in FIG. 8. Here, the weight subsets $fs_0$ and $fs_1$ are assigned with the same PMI bit information "000" and "001" as the weight subsets $fs_0$ and $fs_1$ shown in FIG. 8. As the weight subsets $fs_0$ to $fs_7$ are thus assigned with the PMI bit information, the Hamming distance of PMI bit information assigned to adjacent weight subsets always becomes 1.

Here, description is made about an effect when there occurs transmission error in PMI bit information corresponding to a weight subset from the user apparatus UE in this case. When there occurs transmission error in the right bit, like in the case described in FIG. 8B, there is formed a transmission beam having a directivity analogous to that of a desired transmission beam (transmission beam shown in FIG. 9A). Accordingly, the error detection rate of reception signals in the user apparatus UE is low, thereby preventing serious decrease in throughput. The same goes for the case where there occurs transmission error in the left bit (see FIG. 9H). On the other hand, when there occurs transmission error in the center bit, as illustrated in FIG. 9D, there is formed a transmission beam having a directivity that is different from that of the desired transmission beam (transmission beam illustrated in FIG. 9A). Accordingly, the error detection rate of reception signals in the user apparatus UE is increased, thereby causing significant reduction in throughput.

That is, when using the codebook W1 according to the first aspect, if there occurs transmission error in PMI bit information, it is possible to reduce the percentage of forming a transmission beam with a directivity extremely different from that of a transmission beam formed with a proper weight subset $fs_0$, as compared with the case of using the codebook illustrated in FIG. 8. With this structure, as it is possible to reduce the error detection rate of reception signals in the desired user apparatus UE, it is possible to prevent reduction in throughput in the user apparatus UE. Consequently, it becomes possible to suppress deterioration of the throughput performance of the whole MIMO system.

Further, when each weight in the codebook W2 is assigned with PMI bit information in so-called binary in ascending order, such PMI bit information is given as illustrated in FIG. 10. That is, the weight $f_{10}$ is given "00", the weight $f_{11}$ is given "01", the weight $f_{12}$ is given "10" and the weight $f_{13}$ is given "11".

Next description is made about an effect caused when there occurs transmission error in the PMI bit information corresponding to a weight from the user apparatus UE. Here, it is assumed that the weight $f_{11}$ is a desired weight. And, description is also made about a transmission beam formed when there occurs transmission error in one bit of the PMI bit information "01" assigned to the weight $f_{11}$.

If there occurs transmission error in the right bit, the PMI bit information becomes "00" and there is formed a transmission beam corresponding to a transmission beam properly formed with the weight $f_{10}$. And, where there occurs transmission error in the left bit, the PMI bit information becomes "11" and there is formed a transmission beam corresponding to a transmission beam properly formed with the weight $f_{13}$.

Figure 10B:
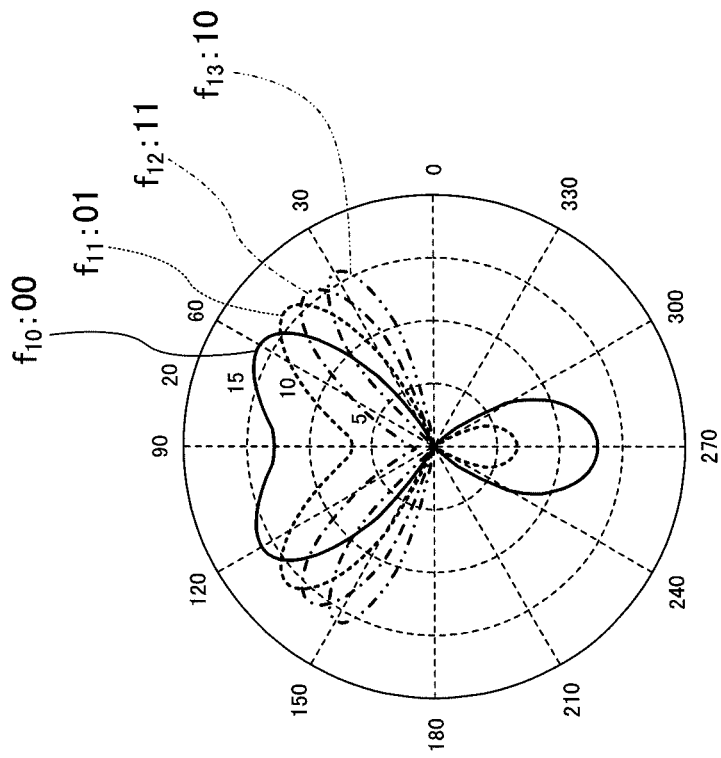
FIG. 10 provides explanatory diagrams of structural examples of PMIs to be assigned to a second codebook used in the communication control method according to the first aspect.
Figure 10A:
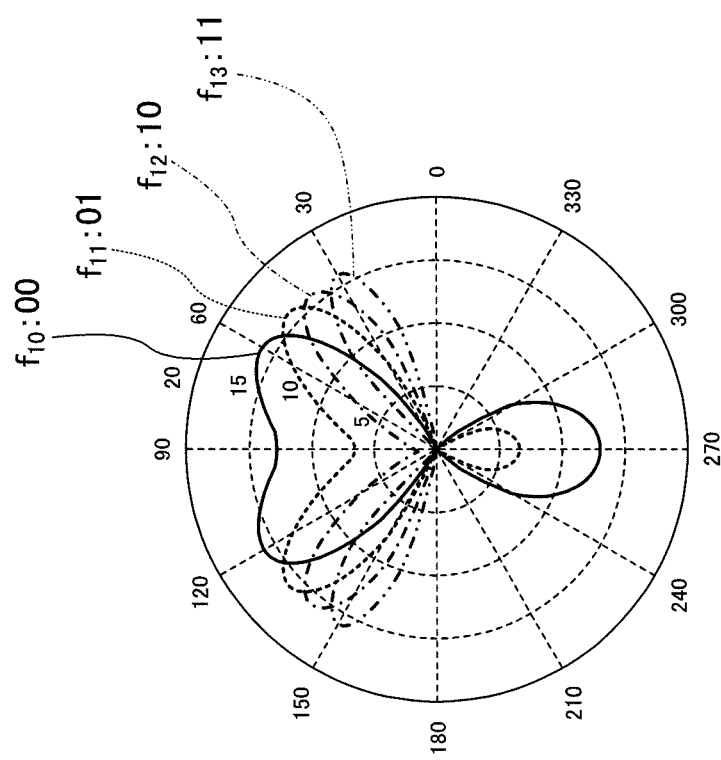

When there occurs transmission error in the right bit, as illustrated in FIG. 10A, the formed transmission beam is analogous to a desired transmission beam and accordingly, the error detection rate of reception signals in the user apparatus UE is low, resulting in that the throughput is only somewhat reduced. However, when there occurs transmission error in the left bit, the formed transmission beam is different from the desired transmission beam and accordingly, the error detection rate of reception signals in the user apparatus UE is increased, thereby resulting in reduction in throughput.

The weights $f_{10}$ to $f_{13}$ defined in the codebook W2 used in the communication control method according to the first aspect are assigned with the PMI bit information as illustrated in FIG. 10B. This assignment of the PMI bit information is performed by gray coding like in the cases shown in FIGS. 5 and 9. That is, the bit information of the weight $f_{12}$ is assigned with the bit information "11" of the weight $f_{13}$ shown in FIG. 10A, and the bit information of the weight $f_{13}$ is assigned with the bit information "10" of the weight $f_{12}$ shown in FIG. 10A. As the weights $f_{10}$ to $f_{13}$ are thus assigned with the bit information, the Hamming distance of PMI bit information assigned with adjacent weights always becomes 1.

Here, description is made about an effect when there occurs transmission error in PMI bit information corresponding to a weight subset from the user apparatus UE in this case. Also when there occurs transmission error in the left and right bit, as illustrated in FIG. 10B, the formed transmission beam has a directivity analogous to that of the desired transmission beam. Accordingly, the error detection rate of reception signals in the user apparatus UE is low, thereby preventing serious reduction in throughput.

In other words, when using the codebook W2 according to the first aspect, even when there occurs transmission error in the PMI bit information, it is possible to prevent forming of a transmission beam having a directivity extremely different from that of the transmission beam formed with the proper weight $f_{11}$, as compared with the case of using the codebook illustrated in FIG. 10A. With this structure, as it is possible to reduce the error detection rate of reception signals in the desired user apparatus UE, it is possible to prevent reduction in throughput in the user apparatus UE. Consequently, it becomes possible to prevent deterioration of the throughput performance of the whole MIMO system.

As described above, in the codebook according to the first aspect, the PMI bit information is assigned to the weights (weight subsets) by gray coding. Assignment of the PMI bit information to the weights by gray coding is optimal for the bit information in binary. This is because there exist two adjacent transmission beams for each transmission beam. However, when the PMI bit information is composed of three or more bits, there may occur a situation where the assignment of PMI bit information to weights by gray coding does not optimally help to prevent deterioration of the throughput performance of the whole system.

In the codebook used in the communication control method according to the second aspect of the present invention (codebook according to the second aspect), the PMI bit information is assigned to weights in such a manner as to minimize a total sum of angular differences of transmission beams (hereinafter referred to as "transmission error-based transmission beams" as appropriate) formed with weights that may be selected when there occurs transmission error in the PMI bit information given back from the user apparatus US. The following description is made about a specific example of assignment of PMI bit information in the codebook according to the second aspect. Here, for convenience of explanation, the description is made using transmission beams formed with weights corresponding to the PMI bit information in the codebook.

Figure 11:
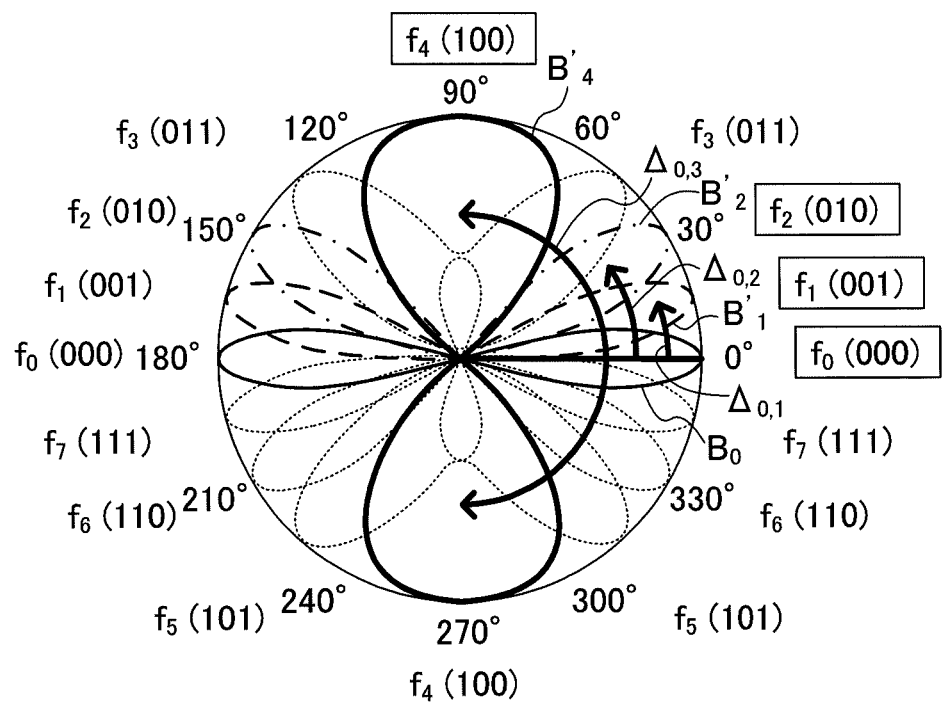
FIG. 11 is a diagram for explaining assignment PMI bit information in codebooks according to second and third aspects of the present invention.

FIG. 11 is a diagram for explaining assignment of PMI bit information in the codebook according to the second aspect. In FIG. 11, a structural example of transmission beams is shown which are formed when there occurs transmission error in the PMI bit information given back from the user apparatus UE using the typical codebook. On the assumption that the transmission beam formed with the weight $f_0$ (hereinafter referred to as "transmission beam $B_0$") is a desired transmission beam, when there occurs transmission error in one bit of the PMI bit information, as illustrated in FIG. 4, there are formed transmission beams corresponding to the transmission beams properly formed with the weights $f_1$, $f_2$ and $f_4$ (hereinafter, referred to as "transmission beam $B'_1$", "transmission beam $B'_2$" and transmission beam $B'_4$", respectively).

These transmission beams $B'_1$, $B'_2$ and $B'_4$ form transmission error-based transmission beams. Here, the transmission beam $B'_1$ has an angular difference $\Delta_{0,1}$ from the transmission beam $B_0$, the transmission beam $B'_2$ has an angular difference $\Delta_{0,2}$ from the transmission beam $B_0$, and the transmission beam $B'_4$ has an angular difference $\Delta_{0,3}$ from the transmission beam $B_0$. When the transmission beam $B'_4$ having a large angular difference from the transmission beam $B_0$ is formed, the error detection rate of reception signals in the user apparatus UE is increased, thereby bringing about reduction in throughput. Therefore, in the codebook according to the second aspect, the PMI bit information is assigned to weights in such a manner as to minimize a total sum of angular differences between the transmission beam $B_0$ and the transmission error-based transmission beams (transmission beams $B'_1$, $B'_2$ and $B'_4$).

A total sum of angular differences between the transmission beam $B_0$ and these transmission beams $B'_1$, $B'_2$ and $B'_4$ are obtained by the following equation (Equation 1).

$$\min \sum_i \sum_{j \neq i} \Delta_{i,j} \qquad \text{(Equation 1)}$$

Here, "i" denotes PMI bit information of a desired transmission beam, and "j" denotes PMI bit information of a transmission error-based transmission beam. And, "$\Delta_{i,j}$" is a function to obtain a total sum of angular differences from the PMI bit information of the desired transmission beam and the PMI bit information of the transmission error-based transmission beams.

When using the codebook according to the second aspect, even when there occurs transmission error in the PMI bit information, the transmission beam based on the transmission error can be made close to the desired transmission beam. With this structure, it is possible to reduce the error detection rate of reception signals in the desired user apparatus UE, thereby making it possible to prevent reduction in throughput in the user apparatus UE. Consequently, it is possible to prevent deterioration of the throughput performance of the whole MIMO system.

Particularly, in the codebook according to the second aspect, as the PMI bit information is assigned to weights in such a manner as to minimize a total sum of angular differences of the transmission error-based transmission beams, it is possible to make these transmission error-based transmission beams close to the desired transmission beam irrespective of the number of bits in the PMI bit information, and it is also possible to prevent deterioration of the throughput performance of the whole system effectively even when the PMI bit information is composed of three or more bits.

Further, the communication control method using the codebook according to the second aspect is applicable to the MIMO system using the above-described double codebooks.

Here, the feedback information from the user apparatus UE contains a PMI as well as a CQI (Channel Quality Indicator) corresponding to the PMI. For example, when the user apparatus UE sends as feedback information the PMI having PMI bit information "000", a CQI for using a weight corresponding to the PMI is communicated to the base station apparatus eNode B. Accordingly, when the PMI is selected wrongly by the base station apparatus eNode B, the CQI becomes a lower value than that has been given back in actual data reception, thereby resulting in increase in the error detection rate of reception signals.

A CQI value measured by the user apparatus UE in the actual data reception is most affected by transmission array gain values in view of precoding. Here, transmission array gain is a gain that is obtained by using a plurality of transmission antenna elements (array) and adding powers of radio waves transmitted with respective array antennas effectively at the user apparatus UE. In the codebook used in the communication control method according to the third aspect of the present invention (codebook according to the third aspect), the PMI bit information is assigned to weights in such a manner as to maximize a total sum of array gains in transmission error-based transmission beams when there occurs transmission error in PMI bit information given back from the user apparatus UE. The following description is made, with reference to the example illustrated in FIG. 11, about assignment of PMI bit information in the codebook according to the third aspect.

In FIG. 11, on the assumption that the transmission beam $B_0$ is a desired transmission beam, the transmission beams $B'_1$ and $B'_2$ have relatively great reception gains in the user apparatus UE in the 0-degree direction. On the other hand, the transmission beam $B'_4$ has a smaller gain in the user apparatus UE in the 0-degree direction. When the transmission beam $B'_4$ with a small reception gain in the user apparatus UE is thus formed, the error detection rate of reception signals in the user apparatus UE is increased, resulting in reduction in throughput. Accordingly, in the codebook according to the third aspect, the PMI bit information is assigned to weights in such a manner as to maximize a total sum of array gains in the transmission error-based transmission beams (transmission beams $B'_1$, $B'_2$ and $B'_4$).

A total sum of array gains of transmission error-based transmission beams is obtained by the following equation (Equation 2).
Here, $$\max \sum_{v_i i''} \sum_{j \neq i} |f_j^H f_i| \quad \text{(Equation 2)}$$

denotes PMI bit information of a desired transmission beam, and "j" denotes PMI bit information of a transmission error-based transmission beam. And, "$f_j^H f_i$" is a function to obtain a total sum of array gains from the PMI bit information of the desired transmission beam and the PMI bit information of the transmission error-based transmission beams.

When using the codebook according to the third aspect, even when there occurs transmission error in the PMI bit information, it is possible to assure reception gains in the user apparatus on the basis of transmission error-based transmission beams. Accordingly, as it is possible to reduce the error detection rate of reception signals in the desired user apparatus UE, it becomes possible to prevent reduction in throughput in the desired user apparatus. Consequently, it is possible to prevent deterioration of the throughput performance of the whole MIMO system.

Particularly, in the codebook according to the third aspect, as the PMI bit information is assigned to weights in such a manner as to maximize a total sum of array gains of transmission error-based transmission beams, it is possible to make the transmission error-based transmission beams close to the desired transmission beam irrespective of the number of bits in the PMI bit information. Accordingly, even when the PMI bit information is composed of four or more bits, it is possible to suppress deterioration of the throughput performance of the whole system in an effective manner.

And, the communication control method using the codebook according to the third aspect is applicable to the MIMO system using the above-described double codebooks.

Here, in the codebooks according to the second and third aspects, the PMI bit information is assigned to weights in such a manner as to minimize a total sum of angular differences or to maximize a total sum of array gains. These methods are suitable for improving adverse effects of all the transmission error-based transmission beams in the codebook averagely. However, assignment of the PMI bit information is not limited to these methods, but may be modified as appropriate. For example, noting only the most adversely affected transmission beam (for example, transmission beam B'$_4$ illustrated in FIG. 11) out of transmission error-based transmission beams, this adverse effect may be only improved. For example, in the communication control method according to the second aspect, the PMI bit information may be assigned to weights in such a manner as to find a transmission beam of largest angular difference and minimize the angular difference of such a transmission beam. And, in the communication control method according to the third aspect, the PMI bit information may be assigned to weights in such a manner as to find a transmission beam of smallest reception gain and maximize the reception gain of such a transmission beam.

In the following, an embodiment of the present invention is described in detail with reference to the accompanying drawings. Here, it is assumed that there are used a base station apparatus and a mobile station apparatus supporting the LTE-A system.

Figure 12:
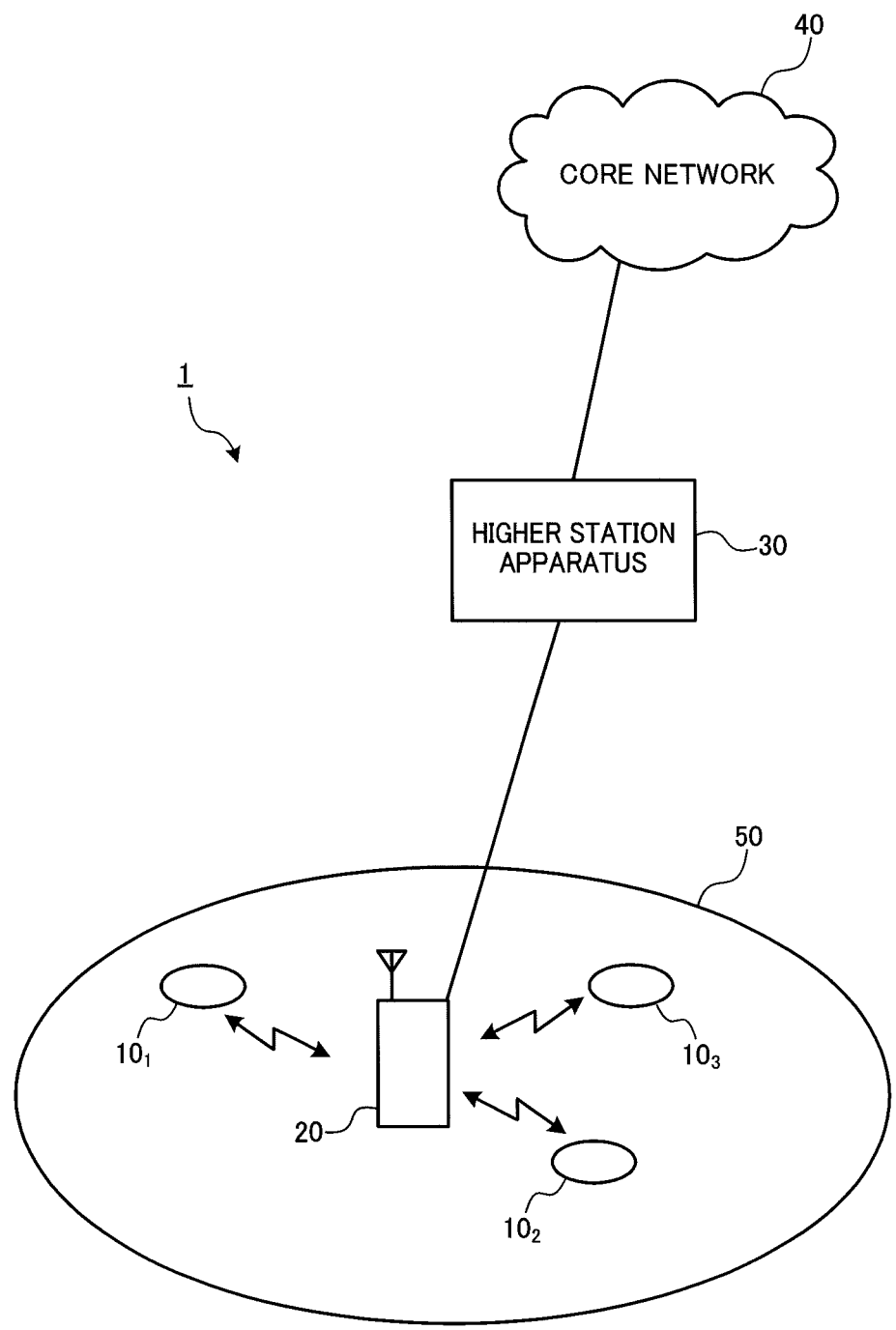
FIG. 12 is a diagram for explaining a configuration of the mobile communication system according to an embodiment of the present invention.

With reference to FIG. 12, description is made about a mobile communication system 1 having mobile station apparatuses (UE) 10 and a base station apparatus (eNode B) 20 according to an embodiment of the present invention. FIG. 12 is a diagram for explaining a configuration of the mobile communication system 1 having the mobile station apparatuses (UE) 10 and the base station apparatus (eNode B) 20 according to the embodiment of the present invention. The mobile communication system 1 shown in FIG. 12 is a system, for example, subsuming the LTE system or SUPER 3G. And, this mobile communication system 1 may be called IMT-Advanced or 4G.

As illustrated in FIG. 12, the mobile communication system 1 is configured to include the base station apparatus 20 and the plural mobile station apparatuses ($10_1, 10_2, 10_3, \ldots, 10_n$, n is an integer satisfying n>0) which communicate with the base station apparatus 20. The base station apparatus is connected to a higher station apparatus 30, which is connected to a core network 40. Each mobile station apparatus 10 communicates with the base station apparatus 20 in a cell 50. Here, the higher station apparatus 30 includes, but is not limited to, for example, an access gateway apparatus, a radio network controller (RNC), a mobility management entity (MME) and the like.

As the mobile station apparatuses ($10_1, 10_2, 10_3, \ldots, 10_n$) have the same structures, functions and states, they are explained below as a mobile station apparatus 10, except where specifically noted. And, for convenience of explanation, it is the mobile station apparatus 10 that perform radio communications with the base station apparatus 20 and more generally, the mobile station apparatus 10 may be a user apparatus (UE: User Equipment) including a mobile station apparatus and a fixed terminal apparatus.

In the radio communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

The downlink communication channels include the PDSCH (Physical Downlink Shared CHannel), which is a downlink data channel used by each mobile station apparatus 10 on a shared basis, and downlink L1/L2 control channels (including the PDCCH (Physical Downlink Control CHannel), PCFICH (Physical Control Format Indicator CHannel) and PHICH (Physical Hybrid-ARQ Indicator CHannel)). This PDSCH transmits user data, that is, normal data signals. Transmission data is included in this user data. Component carriers CCs allocated to the mobile station apparatus 10 by the base station apparatus 20 and scheduling information are sent to the mobile station apparatus 10 by L1/L2 control channels.

The uplink communication channels include a PUSCH (Physical Uplink Shared CHannel), which is an uplink data channel used by each mobile station apparatus 10 on a shared basis, and a PUCCH (Physical Uplink Control CHannel), which is an uplink control channel. User data is transmitted by means of this PUSCH. Furthermore, the PUCCH transmits downlink radio quality information (CQI: Channel Quality Indicator) and so on.

Figure 13:
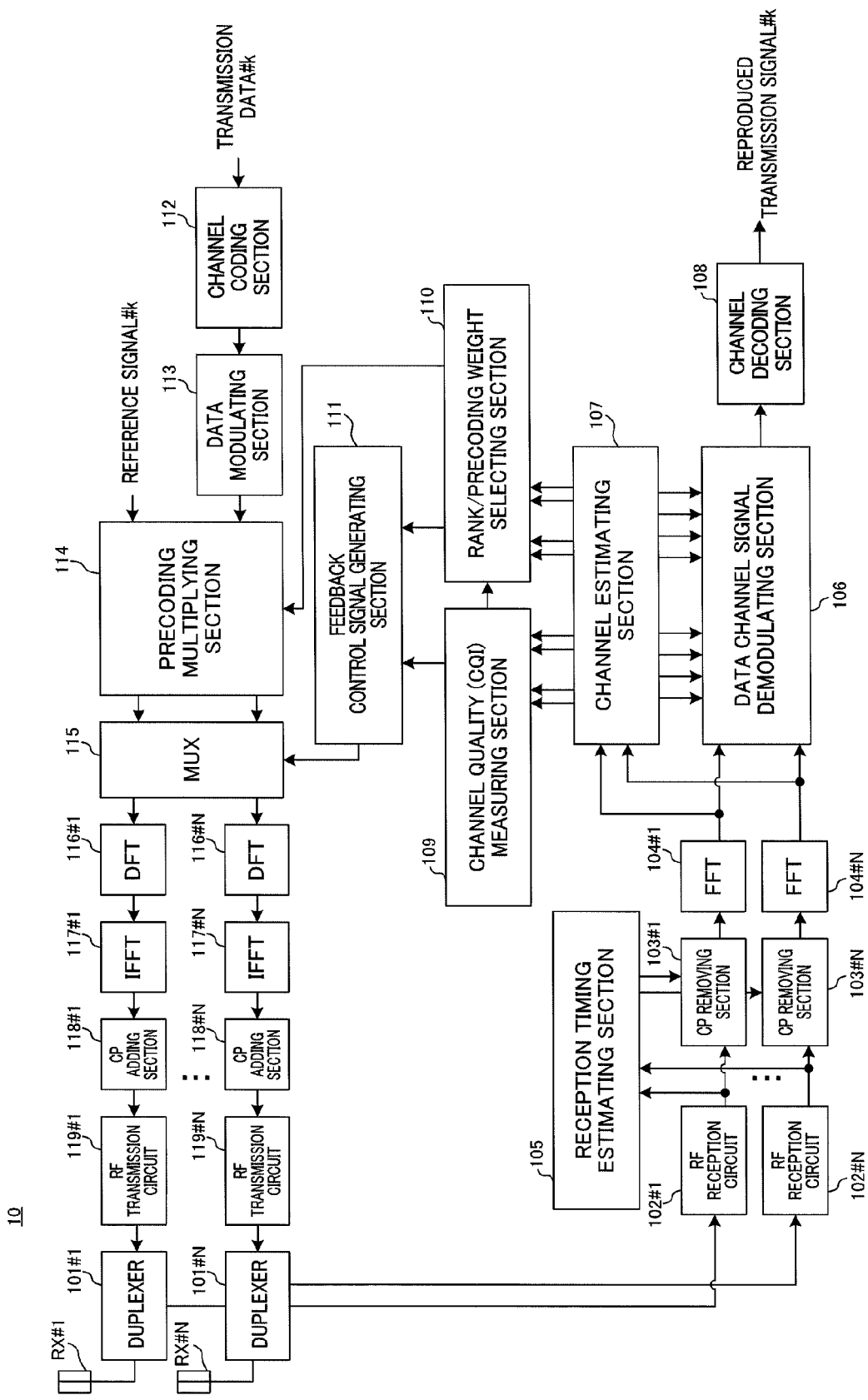
FIG. 13 is a block diagram illustrating the configuration of a mobile station apparatus according to the above-mentioned embodiment.
Figure 14:
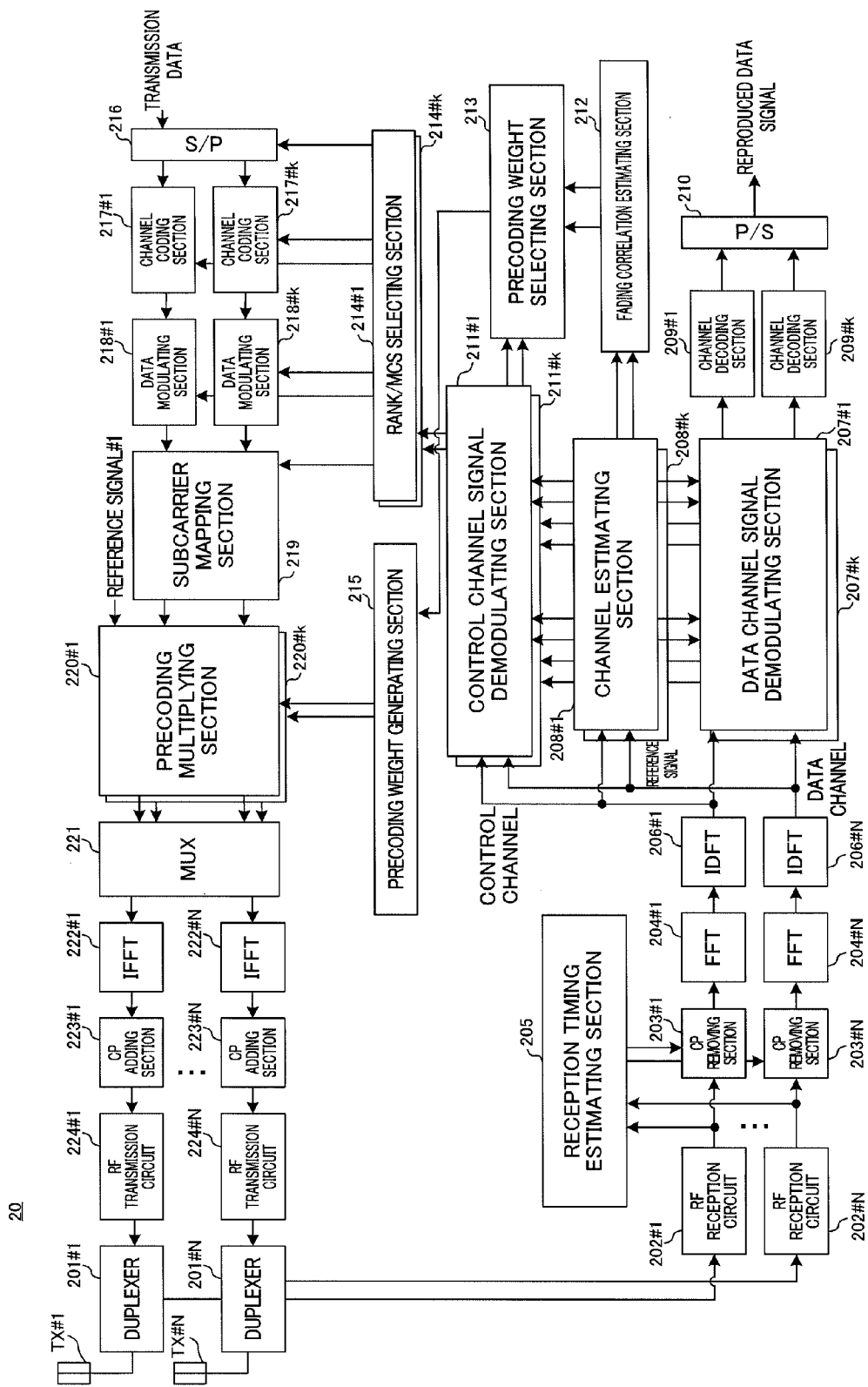
FIG. 14 is a block diagram illustrating the configuration of the base station apparatus according to the above-mentioned embodiment.

Next description is made, with reference to FIGS. 13 and 14, about the configurations of the base station apparatus 20 and the mobile station apparatus according to the present embodiment. FIG. 13 is a block diagram illustrating the configuration of the mobile station apparatus 10 according to the present embodiment. FIG. 14 is a block diagram illustrating the configuration of the base station apparatus 20 according to the present embodiment. Here, the configurations of the mobile station apparatus 10 and the base station apparatus 20 illustrated in FIGS. 13 and 14 are simplified for explanation of the present invention, however, needless to say, they are equipped with normal parts.

In the mobile station apparatus illustrated in FIG. 13, a transmission signal transmitted from the base station apparatus 20 is received by reception antennas RX #1 to RX #N, and electrically separated by duplexers 101 #1 to 101 #N into a transmission path and a reception path and output to RF reception circuits 102 #1 to 102 #N. In the RF reception circuits 102 #1 to 102 #N, the signals are subjected to frequency conversion processing and converted from radio frequency signals to baseband signals. The baseband signals having been subjected to the frequency conversion processing are input to cyclic prefix (CP) removing sections 103 #1 to 103 #N, in which CPs are removed from the signals. After that, the signals are output to fast Fourier transform (FFT) sections 104 #1 to 104 #N, respectively.

A reception timing estimating section 105 estimates reception timings from reference signals contained in the respective reception signals and outputs their estimation results to the CP removing sections 103 #1 to 103 #N. The FFT sections 104 #1 to 104 #N perform Fourier transform on the input reception signals and convert the time-sequence signals into frequency domain signals. After that, data channel signals contained in the reception signals are output to a data channel signal demodulating section 106.

The data channel signal demodulating section 106 separates the data channel signals input from the FFT sections 104 #1 to 104 #N, for example, by MMSE (Minimum Mean Squared Error) or MLD (Maximum Likelihood Detection) signal separating method. With this separation, the data channel signals transmitted from the base station apparatus 20 are separated into data channel signals relating to users #1 to #k so that a data channel signal relating to a user (here, user k) of the mobile station apparatus 10 is extracted.

A channel estimating section 107 estimates channel variances in channel propagation paths from the reference signals contained in the reception signals output from the FFT sections 104 #1 to 104 #N, and communicates the estimated channel variances to the data channel signal demodulating section 106, a channel quality measuring section 109 and a rank/precoding weight selecting section 110 which are described later. In the data channel signal demodulating section 106, the data channel signals are separated on the basis of the communicated channel variances by the MLD signal separating method or the like. With this separation, a reception signal relating to the user k can be demodulated.

Here, prior to the demodulation processing by the data channel signal demodulating section 106, the extracted data channel signal relating to the user k is demapped and returned to a time-sequence signal by a subcarrier demapping section (not shown). The data channel signal relating to the user k demodulated by the data channel signal demodulating section 106 is output to a channel decoding section 108. Then, the signal is subjected to the channel decoding processing by the channel decoding section 108 and finally, a transmission signal for the user k (hereinafter referred to as "transmission signal #k") is reproduced.

The channel quality (CQI) measuring section 109 measures a channel quality (CQI) based on a channel variance communicated from the channel estimating section 107. Then, the channel quality (CQI) measuring section 109 communicates the measured CQI to a rank/precoding weight selecting section 110 and a feedback control signal generating section 111.

The rank/precoding weight selecting section 110 constitutes selecting section and is configured to select a rank (RI) and a precoding weight (PMI) from the codebook based on a channel variance communicated from the channel estimating section 107. Then, the selected precoding weight (PMI) is communicated to a precoding multiplying section 114 and the selected rank (RI) and precoding weight (PMI) are communicated to a feedback control signal generating section 111.

For example, when the communication control method according to the first aspect is applied to this mobile communication system 1, the rank/precoding weight selecting section 110 selects a weight (PMI) from the codebook in which PMI bit information is assigned to weights by gray coding. And, when the communication control method according to the second aspect is applied, a weight (PMI) is selected from the codebook in which PMI is assigned to weights in such a manner as to minimize a total sum of angular differences of transmission error-based transmission beams. Further, when the communication control method according to the third aspect is applied, a weight (PMI) is selected from the codebook in which PMI is assigned to weights in such a manner as to maximize a total sum of array gains of transmission error-based transmission beams. Here, when this mobile communication system comprises the MIMO system using double codebooks, the rank/precoding weight selecting section 110 selects weights $(PMI_1)$ and $(PMI_2)$ from the above-described codebooks W1 and W2, respectively.

The feedback control signal generating section 111 uses the CQI, PMI and RI communicated from the channel quality (CQI) measuring section 109 and the rank/precoding weight selecting section 110, as a basis to generate a control signal (for example, PUCCH) containing feedback information to send them back to the base station apparatus 20. The control signal generated by the feedback control signal generating section 111 is output to a multiplexer (MUX) 115.

In the meantime, a transmission data #k relating to the user #k sent from the higher layer is subjected to channel coding by a channel coding section 112, subcarrier modulation by a data modulating section 113 and output to a precoding multiplying section 114. The precoding multiplying section 114 receives as input a reference signal #k relating to the user #k generated by a reference signal generating section (not shown). The precoding multiplying section 114 uses as a basis a weight obtained from a PMI selected by the rank/precoding weight selecting section 110 to perform phase and/or amplitude shift of the transmission data #k and reference signal for each of the reception antennas RX #1 to RX #N. And, the transmission data #k and reference signal having been subjected to phase and/or amplitude shift are output to the multiplexer (MUX) 115.

The multiplexer (MUX) 115 combines the transmission data #k and reference signal #k having been subjected to phase and/or amplitude shift with a control signal generated by the feedback control signal generating section 111 and generates a transmission signal for each of the reception antennas RX #1 to RX #N. The transmission signals generated by the multiplexer (MUX) 115 are subjected to discrete Fourier transform at discrete Fourier transform (DFT) sections 116 #1 to 116 N and each transmission signal sequence is spread to a transmission bandwidth (DFT size) in a frequency domain.

Then, the signals are subjected to inverse fast Fourier transform by inverse fast Fourier transform (IFFT) sections 117 #1 to 117 #N and converted from frequency domain signals into time domain signals, which are then added with CPs at CP adding sections 118 #1 to 118 #N and output to RF transmission circuits 119 #1 to 119 #N. The signals are subjected to the frequency conversion processing by RF transmission circuits 119 #1 to 119 #N and converted into a radio frequency band, output to reception antennas RX #1 to RX #N via duplexers 101 #1 to 101 #N, and the signals are transmitted from the reception antennas RX #1 to RX #N to the base station apparatus 20 on the uplink. Here, these transmission processing sections form feedback section for sending feedback information back to the base station apparatus 20.

Thus, in the mobile station apparatus 10 according to the present embodiment, as the PMI is selected from the codebooks according to any of the first and third aspects and feedback information containing this PMI is given back to the base station apparatus 20, it is possible to give the PMI bit information adjusted to suppress any affect due to feedback error for the base station apparatus 20, back to the base station apparatus 20.

In the base station apparatus 20 illustrated in FIG. 14, transmission signals sent from the mobile station apparatus 10 are received by transmission antennas TX #1 to TX #N, electrically separated by duplexers 201 #1 to 201 #N into a transmission path and a reception path, and output to RF reception circuits 202 #1 to 202 #N. Then, in the RF reception circuits 202 #1 to 202 #N, the signals are subjected to the frequency conversion processing and converted from radio frequency signals into baseband signals. The baseband signals having been subjected to the frequency conversion processing are then subjected to CP removal at cyclic prefix (CP) removing sections 203 #1 to 203 #N, and output to fast Fourier transform (FFT) sections 204 #1 to 204 #N. A reception timing estimating section 205 estimate reception timings from reference signals contained in the reception signals and communicates the estimation results to CP removing sections 203 #1 to 203 #N. The FFT sections 204 #1 to 204 #N perform Fourier transform on the input reception signals and convert them from time-sequence signals to frequency domain signals. The reception signals having been converted into the frequency domain signals are subjected to inverse discrete Fourier transform by inverse discrete Fourier transform (IDFT) sections 206#1 to 206 #N and are despread into time domain signals. Then, data channel signals contained in the reception signals are output to data channel signal demodulating sections 207 #1 to 207 #k.

The data channel signal demodulating sections 207 #1 to 207 #k separate data channel signals input from the IDFT sections 206 #1 to 206 #N, for example, by the MMSE or MLD signal separating method. With this separation, data channel signals sent from the mobile station apparatuses 10 are separated into data channel signals relating to users #1 to #k, and the data channel signals are extracted for the respective mobile station apparatuses 10.

The channel estimating sections 208 #1 to 208 #k estimate channel variances from reference signals contained in the reception signals output from the IDFT sections 206 #1 to 206 #N and communicate the estimated channel variances to the data channel signal demodulating sections 207 #1 to 207 #k, control channel signal demodulating sections 211 #1 to 211 #k and a fading correlation estimating section 212 described later. The data channel signal demodulating sections 207 #1 to 207 #k separate the data channel signals based on the communicated channel variances by the above-mentioned MLD signal separating method. With this separation, reception signals relating to respective mobile station apparatuses 10 are demodulated.

Here, prior to the demodulation processing by the data channel signal demodulating section 207, a data channel signal relating to each extracted mobile station apparatus 10 is demapped by a subcarrier demapping section (not shown) and returned to a time-sequence signal. The data channel signals relating to the respective mobile station apparatuses 10 demodulated by data channel signal demodulating sections 207 #1 to 207 #k are output to the channel decoding sections 209 #1 to 209 #k. Then, the signals are subjected to channel decoding processing by channel decoding sections 209 #1 to 209 #k and parallel-serial converted by parallel/serial (P/S) converting section 210, and thereby, data channel signals (data signals) from the respective mobile station apparatuses 10 are reproduced.

Control channel signal demodulating sections 211 #1 to 211 #k demodulate control channel signals (for example, PDSCH) contained in reception signals input from the IDFT sections 206 #1 to 206 #N. At this time, in the control channel signal demodulating sections 211 #1 to 211 #k, the control channel signals are demodulated based on channel variances communicated from the channel estimating sections 208 #1 to 208 #k. Each control channel signal contains feedback information from the mobile station apparatus 10. This feedback information contains a RI, a PMI and a CQI selected by the mobile station apparatus 10. Control channel signals demodulated by the control channel signals demodulating sections 211 #1 to 211 #k are output to rank/MCS selecting sections 214 #1 to 214 #k and a precoding weight selecting section 213 described later.

A fading correlation estimating section 212 estimates fading correlation values of channel propagation paths based on channel variances communicated from the channel estimating sections 208 #1 to 208 #k. Then, the fading correlation estimating section 212 notifies the precoding weight selecting section 213 of the estimated fading correlation values.

The precoding weight selecting section 213 forms selecting section and is configured to select a rank (RI) and a weight (PMI) from a codebook based on the feedback information (RI and PMI) output from the control channel signal demodulating sections 211 #1 to 211 #k and fading correlation values communicated from the fading correlation estimating section 212. Then, the precoding weight selecting section 213 notifies a precoding weight generating section 215 of the selected rank (RI) and weight (PMI).

For example, when the communication control method according to the first aspect is applied to the present mobile communication system 1, the precoding weight selecting section 213 selects a weight (PMI) from the codebook in which PMI bit information is assigned to weights by gray coding. And, when the communication control method according to the second aspect is applied, a weight (PMI) is selected from the codebook in which PMI bit information is assigned to weights in such a manner as to minimize a total sum of angular differences of transmission error-based transmission beams. Further, when the communication control method according to the third aspect is applied, a weight (PMI) is selected from the codebook in which PMI bit information is assigned to weights in such a manner as to maximize a total sum of array gains of transmission error-based transmission beams. Here, when the present mobile communication system is a MIMO system using the double codebooks, the precoding weight selecting section 213 selects weights ($PMI_1$) and ($PMI_2$) from the above-mentioned codebooks W1 and W2, respectively.

Rank/MCS (Modulation and Coding Scheme) selecting sections 214 #1 to 214 #k select ranks/MCSs based on control channel signals communicated from the control channel signal demodulating sections 211 #1 to 211 #k. The selected ranks/MCSs are output to channel coding sections 217 #1 to 217 #k and data modulating sections 218 #1 to 218 #k.

The precoding weight generating section 215 uses the ranks (RIs) and weights (PMIs) communicated from the precoding weight selecting section 213 as a basis to generate weights for actual precoding of transmission data. For example, in the precoding weight generating section 215, the weights are generated in consideration of Zero-forcing so as to remove interference. The selected weights are output to precoding multiplying sections 220 #1 to 220 #k described later.

On the other hand, the transmission data pieces #1 to #k for the users #1 to #k are output to the serial/parallel converter (S/P) 216 and subjected to serial/parallel conversion, and then, output to channel coding sections 217 #1 to 217 #k corresponding to the respective users #1 to #k. This serial/parallel conversion in the serial/parallel converting section (S/P) 216 is performed based on the number of multiplexed users communicated from a scheduler (not shown). And, the serial/parallel conversion processing in the serial/parallel converting section (S/P) 216 is performed with reference to ranks/MCSs communicated from the rank/MCS selecting sections 214 #1 to 214 #k.

The serial/parallel converted transmission data #1 to #k are channel-coded by the channel coding sections 217 #1 to 217 #k, output to the data modulating sections 218 #1 to 218 #k and data modulated. At this time, channel coding and data modulation are performed based on MCSs given from the rank/MCS selecting sections 214 #1 to 214 #k. The transmission data pieces #1 to #k data-modulated by the data modulating sections 218 #1 to 218 #k are subjected to inverse Fourier transform by a discrete Fourier transform section (not shown), converted from time-sequence signals into frequency domain signals and output to a subcarrier mapping section 219.

In the subcarrier mapping section 219, the transmission data #1 to #k is mapped in accordance with schedule information given by a scheduler (not shown). At this time, the subcarrier mapping section 219 maps (multiplexes) reference signals #1 to #k input from reference signal generating sections (not shown), and transmission data pieces #1 to #k to subcarriers. The transmission data pieces #1 to #k thus mapped to the subcarriers are output to the precoding multiplying sections 220 #1 to 220 #k.

The precoding multiplying sections 220 #1 to 220 #k form precoding section and is configured to perform phase and/or amplitude shift on transmission data pieces #1 to #k for each of the transmission antennas TX #1 to TX #N (weighting on transmission antennas TX #1 to TX #N by precoding). Then, the transmission data pieces #1 to #k having been subjected to phase and/or amplitude shift by the precoding multiplying section 220 are output to the multiplexer (MUX) 221.

In the multiplexer (MUX) 221, the transmission data pieces #1 to #k having been subjected to phase and/or amplitude shift are combined to generate a transmission signal for each of the transmission antennas TX #1 to TX #N. The transmission signals generated by the multiplexer (MUX) 221 are subjected to inverse fast Fourier transform by inverse fast Fourier transform (IFFT) sections 222 #1 to 222 #N and converted from frequency domain signals to time domain signals. Then, the signals are added with CPs by cyclic prefix (CP) adding sections 223 #1 to 223 #N and output to the RF transmission circuits 224 #1 to 224 #N. After that, the signals are subjected to frequency conversion processing and converted into a radio frequency band by the RF transmission circuits 224 #1 to 224 #N, output to the transmission antennas TX #1 to TX #N via the duplexers 201 #1 to 201 #N, and sent by the transmission antennas TX #1 to TX #N to the mobile station apparatus 10 on the downlink. Here, these transmission processing sections form transmitting section for transmitting a transmitting signal to the mobile station apparatus 10.

In this way, in the base station apparatus 20 according to the present embodiment, a PMI is selected from a codebook used in the communication control method according to any of the first to third aspects, this PMI is used as a basis to generate a weight, and precoding is performed on transmission data in accordance with this weight. With this structure, even when there occurs error in feedback from the mobile station apparatus 10, it is possible to prevent precoding from being performed with a weight extremely different from a proper weight. Accordingly, it becomes possible to prevent serious reduction in throughput in the mobile station apparatus 10, thereby making it possible to prevent deterioration of the throughput performance of the whole system in the mobile communication system performing MIMO transmission.

As described above, according to the communication control method according to the present invention, in the codebook, the PMI bit information assigned to weights is adjusted in such a manner as to suppress any effect due to feedback error from the mobile station apparatus 10. With this structure, even when there occurs error in feedback from the mobile station apparatus 10, it is possible to prevent precoding from being performed with a weight extremely different from a proper weight. Accordingly, it becomes possible to prevent serious reduction in throughput in the mobile station apparatus 10, thereby making it possible to prevent deterioration of the throughput performance of the whole system in the mobile communication system performing MIMO transmission.

Up to this point, the present invention has been described in detail with reference to the above embodiments. A person of ordinary skill in the art would understand that the present invention is not limited to the embodiments described in this description. The present invention may be embodied in various modified and altered forms without departing from the spirit and scope of the present invention as defined in the claims. Accordingly, this description has been made for illustrative purposes and is not intended for limiting the present invention.

For example, the above-described embodiment has been described on the assumption that the PMI bit information assigned to weights in the codebook is adjusted so as to suppress any effect of transmission error-based transmission beams. However, the adjusting method in assigning the PMI bit information to weights is not limited to this, but may include any adjusting method to suppress any effect due to feedback error from the mobile station apparatus 10 (including error other than the transmission error of the PMI bit information).

The disclosure of Japanese Patent Application No. 2010-181788, filed on Aug. 16, 2010, including the specification, drawings, and abstract, is incorporated herein by reference in its entirety.

The invention claimed is:

1. A communication control method comprising the steps of:
giving, as feedback, a PMI (Precoding Matrix Indicators) selected from a codebook in which there are defined a plurality of precoding weights and a plurality of PMIs assigned to the precoding weights to a second communication apparatus;

performing precoding on a transmission signal based on the precoding weight selected from the codebook by using the fed-back PMI; and transmitting the transmission signal to a first communication apparatus, wherein bit information of the plurality of PMIs assigned to the precoding weights in the codebook is adjusted to suppress an effect of feedback error from the first communication apparatus.

2. The communication control method according to claim 1, wherein the bit information of the PMIs assigned to the precoding weights in the codebook is adjusted in such a manner as to suppress an effect of a transmission beam formed with the PMI in which feedback error is detected.

3. The communication control method according to claim 2, wherein the bit information of the PMIs assigned to the precoding weights in the codebook is adjusted in such a manner that the transmission beam formed with the PMI in which feedback error is detected has a directivity analogous to that of a desired transmission beam.

4. The communication control method according to claim 3, wherein bit information pieces of PMIs assigned to adjacent precoding weights defined in the codebook are arranged by gray coding in such a manner that Hamming distance between the bit information pieces always becomes 1.

5. The communication control method according to claim 3, wherein the bit information of the PMIs assigned to the precoding weights is adjusted in such a manner as to minimize a total sum of angular differences between a desired transmission beam and transmission beams formed with PMIs in which feedback error is detected.

6. The communication control method according to claim 3, wherein the bit information of the PMIs assigned to the precoding weights is adjusted in such a manner as to maximize a total sum of array gains of transmission beams formed with PMIs in which feedback error is detected.

7. The communication control method according to claim 2, wherein the codebook comprises a first codebook and a second codebook and bit information of PMIs assigned to precoding weights in the first codebook is adjusted in such a manner as to suppress the effect of the transmission beam formed with the PMI in which feedback error is detected.

8. The communication control method according to claim 2, wherein the codebook comprises a first codebook and a second codebook and bit information of PMIs assigned to precoding weights in the second codebook is adjusted in such a manner as to suppress the effect of the transmission beam formed with the PMI in which feedback error is detected.

9. A base station apparatus comprising:

a selecting section configured to select a precoding weight from a codebook in which there are defined a plurality of precoding weights and a plurality of PMIs (Precoding Matrix Indicators) assigned to the precoding weights;

a precoding section configured to perform precoding on a transmission signal based on the precoding weight selected by the selecting section;

a transmitting section configured to transmit, to a mobile station apparatus, the transmission signal on which the precoding is performed by the precoding section, wherein bit information of the plurality of PMIs assigned to the precoding weights in the codebook is adjusted to suppress an effect of feedback error from the mobile station apparatus.

10. The base station apparatus according to claim 9, wherein the bit information of the PMIs assigned to the precoding weights in the codebook is adjusted in such a manner as to suppress an effect of a transmission beam formed with the PMI in which feedback error is detected.

11. A mobile station apparatus comprising:

a selecting section configured to select a PMI (Precoding Matrix Indicator) from a codebook in which there are defined a plurality of precoding weights and a plurality of PMIs assigned to the precoding weights; and a feedback section configured to giving, as feedback, the PMI selected by the selecting section to a base station apparatus, wherein bit information of the plurality of PMIs assigned to the precoding weights in the codebook is adjusted to suppress an effect of feedback error to the base station apparatus.

12. The mobile station apparatus according to claim 11, wherein the bit information of the PMIs assigned to the precoding weights in the codebook is adjusted in such a manner as to suppress an effect of a transmission beam formed with the PMI in which feedback error is detected.

* * * * *